(12) United States Patent
Wang et al.

(10) Patent No.: US 6,212,657 B1
(45) Date of Patent: Apr. 3, 2001

(54) SYSTEM AND PROCESS FOR DELIVERING DIGITAL DATA ON DEMAND

(75) Inventors: Pong-sheng Wang; Ching-San Hsu, both of San Jose, CA (US)

(73) Assignee: nStreams Technologies, Inc., Santa Clara, CA (US)

( * ) Notice: Subject to any disclaimer, the term of this patent is extended or adjusted under 35 U.S.C. 154(b) by 0 days.

(21) Appl. No.: 09/318,524

(22) Filed: May 25, 1999

Related U.S. Application Data

(62) Division of application No. 08/692,697, filed on Aug. 8, 1996.

(51) Int. Cl.⁷ .................................................. G06F 11/00
(52) U.S. Cl. ................................ 714/746; 714/6
(58) Field of Search .................... 714/766, 764, 714/763, 6; 348/7, 13, 6; 709/217, 219

(56) References Cited

U.S. PATENT DOCUMENTS

| | | | |
|---|---|---|---|
| 5,440,336 | 8/1995 | Buhro et al. | 348/13 |
| 5,442,390 | 8/1995 | Hopper et al. | 348/7 |
| 5,473,362 | 12/1995 | Fitzgerald et al. | 348/7 |
| 5,508,732 | 4/1996 | Bottomley et al. | 348/7 |
| 5,519,435 | 5/1996 | Anderson | 348/8 |
| 5,521,631 | 5/1996 | Budow et al. | 348/7 |
| 5,528,282 | 6/1996 | Voeten et al. | 348/7 |
| 5,533,021 | 7/1996 | Branstad et al. | 370/396 |
| 5,583,876 | * 12/1996 | Kakuta | 714/766 |
| 5,623,595 | * 4/1997 | Bailey | 714/6 |
| 5,719,983 | * 2/1998 | Henderson et al. | 386/70 |
| 5,754,756 | * 5/1998 | Watanabe et al. | 714/6 |
| 5,793,971 | * 8/1998 | Fujita et al. | 709/219 |
| 5,832,196 | * 11/1998 | Lucht | 714/6 |

FOREIGN PATENT DOCUMENTS

| | | | |
|---|---|---|---|
| 9526103 | 9/1995 | (WO) | H04N/5/76 |

OTHER PUBLICATIONS

Mark B. Friedman, "Raid keeps going and going and . . . ",*IEEE Spectrum*; Apr. 1996, pp. 73–79.

* cited by examiner

*Primary Examiner*—Albert Decady
*Assistant Examiner*—Shelly A Chase
(74) *Attorney, Agent, or Firm*—Fenwick & West LLP

(57) ABSTRACT

A video server system and method has a modular and expandable system design to deliver a plurality of video streams on user demand and under user control. The video server system and method has a central control module adapted to receive control commands such as SELECT, PLAY, REWIND, PAUSE etc. to select and playback a video from a plurality of videos stored in a storage module. The central control module is a computer motherboard having a first small computer serial interface (SCSI) coupled to the storage device. The central control module also has memory for buffering data blocks of video retrieved from the storage device or devices prior to delivery to the delivery module also included in the system. The delivery module is also a computer motherboard having memory and also having a plurality of video processors for processing the video data prior to coupling the data to a client location. The delivery module additionally has a SCSI interface configured to operate in a target mode so that the central control module transfers video data to the delivery module in the same manner that it would use if it were writing to a conventional SCSI disk drive.

26 Claims, 13 Drawing Sheets

Central Control Module (CCM)
Thread and Message Structure

CCM Stream Thread State Diagram

SYSTEM AND PROCESS FOR DELIVERING DIGITAL DATA ON DEMAND

This divisional application under 37 CFR 1.78 hereby claims the benefit of its parent application, U.S. patent application Ser. No. 08/692,697 entitled "System And Process For Delivering Digital Data On Demand", which was filed by Pong-Sheng Wang and Ching-San Hsu on Aug. 8, 1996 and is incorporated by reference herein in its entirety.

BACKGROUND OF THE INVENTION

1. Field of the Invention

This invention relates generally to real time server systems and processes and more specifically to systems and processes for delivering video streams to client locations.

2. Description of the Related Art

With improvements in data storage, retrieval and compression technology, the use of real time server systems generally and video on demand systems in particular is becoming widespread. Video on demand applications include content distribution in hospitality establishments (i.e., hotels, motels, condominiums, and hospitals), karaoke (usually involving playback of a sound recording sometimes accompanied with a playback of visual information) and information kiosks. Video on demand systems store a selection of video files, (generally each corresponding to a movie, a short informational presentation or any other type of video content) and they retrieve (i.e. playback) a selected video file under user control. Thus, using a video on demand system, a user or multiple users, through a client network, select and then access (i.e. "playback") a video file. Further, conventional video on demand systems generally offer users a variety of control functions, similar to those found on a conventional video cassette recorder (VCR) such as PLAY, STOP, PAUSE, REWIND, and FAST FORWARD. It should be understood that as used herein, the term "video" includes content having both audio and visual portions or exclusively audio or exclusively visual content, as well as other types of digital content.

The channel requirements (i.e. the number of video streams supplied by the server) for video on demand systems vary with the specific video on demand application. A large hotel, for example, will require a greater number of channels than a small one or, information kiosks may have a greater or lesser number of clients to service based on the kiosk location and the type of information being provided by the kiosk. Additionally, video on demand systems are sometimes installed in locations which demand increased channel capacity over time. For example, systems installed in hospitality establishments (i.e. hotels, motels, condominiums and hospitals) may initially service a smaller number of rooms or units, but as facility size is increased, or as consumers gain awareness of the service, demand on the system increases. This problem is perhaps even more prevalent in other application areas, such as information kiosks, where the physical infrastructure required to provide additional client locations is not prohibitive.

Further, video on demand systems have varying video storage requirements based on the particular application. Hospitality establishments, for example, generally want to offer a large selection of feature length video movies and thus have fairly high storage requirements. Information kiosks, on the other hand, tend to have much smaller storage requirements, particularly if the information content is short as compared to feature length movies.

Many conventional video on demand systems have a fixed and high cost architecture. In particular, some conventional video on demand systems use a high-end work station or a particularly high speed computer in order to obtain real-time delivery of multiple video streams. Other conventional video on demand systems employ a computer equipped with multiple processors for event multi-tasking in order to meet the processing demand of delivering multiple video streams. These conventional systems are generally quite costly because they use high-end and/or specialized hardware. These conventional systems have the additional drawback that they are generally designed to accommodate a specified maximum number of video streams and are not able to easily expand beyond that capacity.

It is desirable to have a single low cost video on demand system that is modular to meet the varied requirement of various video on demand applications and which is capable of being expanded to meet the growing needs of an individual server location.

Thus, there is a need for a modular, expandable and cost effective method and process to deliver a large number of video and other digital data streams in parallel.

Further, one important component of video on demand systems in particular, and in computing systems generally, is its mass storage component. In the video server (video on demand) context, the mass storage component stores video content. In other types of computing systems, the mass storage component stores other types of digital content such as computer programs, databases, images, data and the like. Regardless of whether the particular application is in a video on demand system or another type of computer system, the size, speed and cost of the mass storage component impact system specification, performance and costs.

One conventional mass storage architecture uses a redundant array of inexpensive disk drives (RAID). These architectures conventionally use an array of drives that are typically smaller, less expensive and less reliable than some high performance, larger and more costly disk drives conventionally available. Some of these conventional RAID systems employ striping wherein a data object is divided into "data stripes" and the data stripes are then interleaved onto an array of disks to achieve improved performance through parallel disk operations. Additionally, each data stripe is sometimes further subdivided into data blocks sized to facilitate disk access. Generally, conventional disk arrays incorporate redundancy in the form of mirroring or a parity-based mechanism in order to obtain increased reliability.

Specifically, conventional RAID level 1 uses mirroring while some higher level conventional RAID systems use a parity block for error correction. The parity block is conventionally generated by exclusive ORing data blocks across a single stripe slice (i.e., across the disk array). Conventionally, each parity block is stored on a different disk than its associated data stripe. Thus, in the event of a disk failure, the data block stored on the failed disk is reconstructed using the parity block (by exclusive ORing the corresponding parity block with all other data blocks within the data stripe slice).

Thus, in a RAID system with N disks, when one disk fails, it requires reading n–1 data blocks from n–1 disks in order to reconstruct one missing data block. Although the n–1 disk read operations may be performed in parallel to reduce the response time if the subsystem performance load allows, it still adds a substantial burden to the performance load when such failure happens. The greater the number of disks (N) in the system, the worse the performance penalty is during failure mode. Therefore, in order to limit the performance penalty, it is desirable to limit the number of disks (N) to a relatively low number.

On the other hand, in order to gain high performance throughput of a RAID subsystem, it is desirable to have a large number of disks (N) during normal data access so that a large number of disk operations can be performed in parallel. This aspect is in conflict with a small N desirable in the failure mode. Thus, there is a need for a RAID system and method that enhances system reliability and performance without introducing unacceptably large performance penalties during a failure mode.

SUMMARY OF THE INVENTION

In accordance with the present invention, there is provided a modular and expandable video server system that uses conventional low cost components to deliver multiple video streams in real time. The system includes one or more central control modules ("CCMs"), one or more delivery modules ("DMs") and one or more storage modules ("SM"). Each CCM is a conventional computer equipped with two conventional Small Computer Serial Interface ("SCSI") controller cards, each operating in an "initiator" mode for interfacing with one or more DMs and SMs respectively. Each CCM also has local memory used as an intermediate memory buffer to store data retrieved from a SM prior to delivery to a DM. Each CCM additionally has a communication interface for coupling to a single user (client) or a client network. Each CCM processes the commands received from the clients, schedules the playback of the multiple video streams, manages the video file structure and controls the flow of video data to the DM (or DMs) to ensure real-time playback.

Each DM is also a conventional computer equipped with a conventional SCSI controller card operating in a "target" mode. In addition to having a SCSI controller, the DMs are each equipped with one or more processing modules for processing the video stream prior to delivery to the client. In one embodiment, the processing modules are video decoders, each dedicated to decompressing a video data stream. In this embodiment, the decoders are conventional MPEG1 or MPEG2 decoders.

In another embodiment, the processing modules are conventional network interface cards for formatting the video stream and delivering the video stream to a client over a network such as an ethernet, ATM, or PSTN network and the like. Additionally, each DM has local memory used as a video buffer for storing video data prior to processing on the DM.

Each SM is a high capacity storage medium adapted to store digital information such as video data and is accessed by the CCM module using standard SCSI protocol. Each SM, for example is a hard disk, or CD-ROM drive or a bank of hard disks or a bank of CD-ROMS or another type of high capacity storage medium.

Further in accordance with the invention, the CCM manages the file system using a hybrid file management scheme to obtain increased performance in data access and to improve memory utilization. The hybrid file management scheme employs both the file management system that is included in the conventional operating system running on the CCM as well as customized file management software that bypasses the conventional file manager in order to directly control and access raw video data stored on the storage devices. This hybrid scheme optimizes access time with respect to video data yet utilizes the file management services of the operating system to manage the control information associated with the raw video data as well as the video storage maps.

In accordance with another aspect of the present invention, the CCM implements a prioritization method to prioritize the access of the storage devices included in each SM among the plurality of video streams being generated by the server system. For each of a plurality of read requests generated by the plurality of video streams, the prioritization method determines for each request, whether the request (read message) is urgent or non-urgent. A request is urgent if failure to service the request within a specified time will cause a disruption in playback of a video stream. A request is non-urgent if no disruption would result. Preferably, whether a message is urgent or non-urgent is determined by the current state of the video stream. For example, if the stream is currently paused and the request is resuming playback, then the request is non-urgent. If, however, the stream is in the playback state, the request is urgent. The method next computes a deadline for each urgent message. The prioritization method then determines whether there is sufficient time to service a non-urgent request without causing any urgent message to miss its deadline. If this condition is met, the system handles the non-urgent request, otherwise an urgent request is next processed.

In accordance with another aspect of the present invention, the server system and method uses a disk load balancing method to schedule the start of playback of a particular video stream. The method defines a plurality of time zones where preferably, the number of time zones corresponds to the number of storage devices. The method assigns each video stream to a time zone to distribute video stream processing. The method makes such assignment by first identifying the storage device from which the video stream will commence and by then determining the next "available" time zone which will be serviced by that storage device. A time zone is deemed "available" if it has capacity (bandwidth) to handle an additional video stream. The method then assigns that "available" time zone to the newly initiated video stream.

In accordance with yet another aspect of the present invention, the server system and method uses a redundant array of independent disks (RAID) system and method to store a video object. The RAID system and method divides the video object into a plurality of data blocks and stores the data blocks using striping (in a striped arrangement) across a plurality of storage devices (i.e. across N storage devices). In accordance with the system and method, a redundancy factor (M) is selected. The redundancy factor M determines the reliability and failure mode service time during system operation. M is selected to be an integer less than N. In accordance with this aspect of the invention, an error recovery block is computed for every M data blocks stored. Preferably, the error recovery block is a parity code generated by performing an exclusive OR operation on the M data blocks. For large N as compared to M, when a disk failure is encountered the error recovery processes advantageously is limited in the number of required storage device access calls by the redundancy factor (M). In one embodiment the error recovery blocks are stored interleaved with the data blocks but on a different storage device from the storage devices storing the associated data. It should be understood that this aspect of the present invention applies to systems and methods for storing digital data that is not video data and that it also applies to storage systems in contexts other than that of a server.

In accordance with still yet another aspect of the present invention, the CCMs, DMs and SMs are each adapted for rack-mounting in a rack mounted system to enhance system flexibility and expansion.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DESCRIPTION OF THE PREFERRED EMBODIMENTS

Figure 1A:
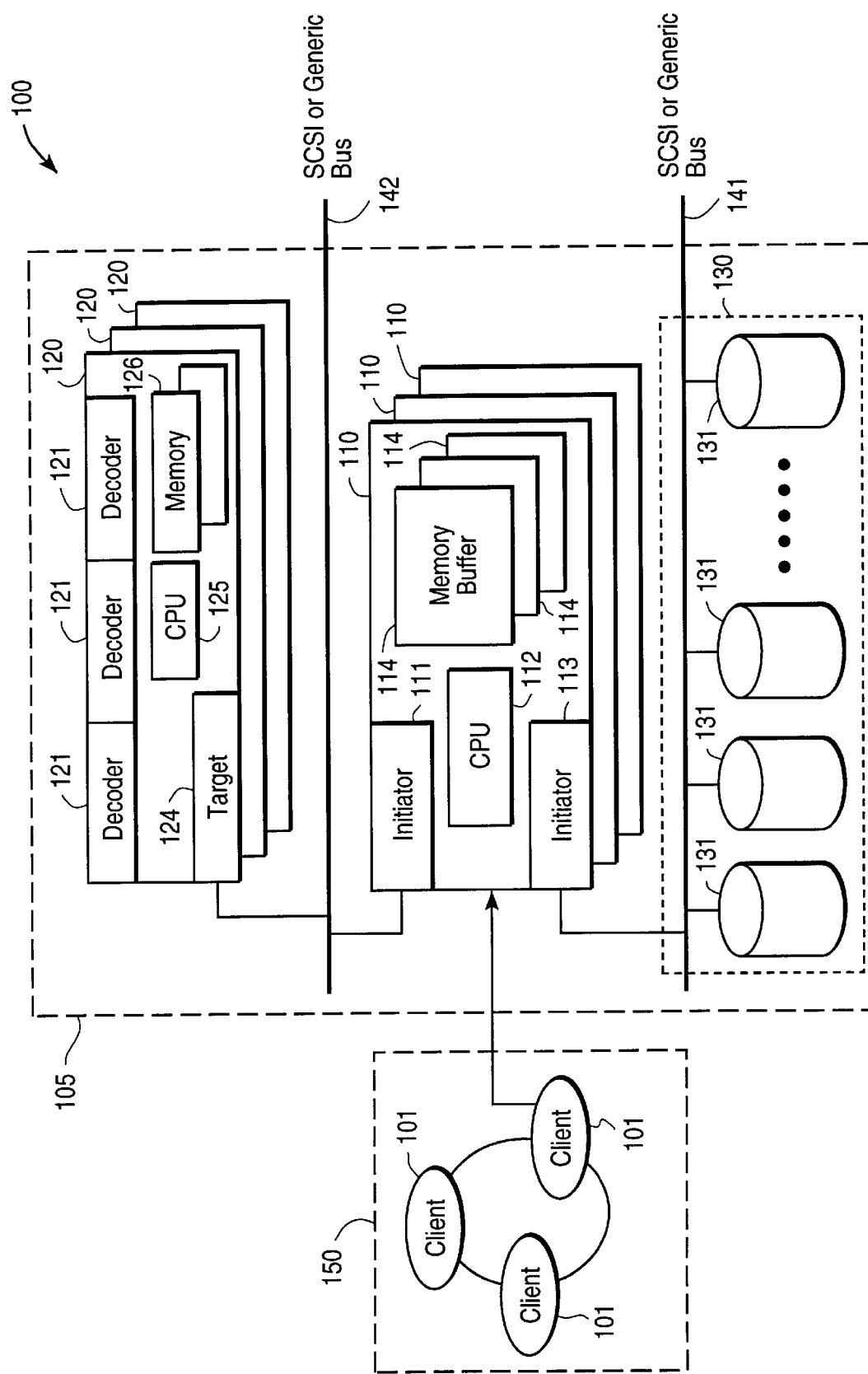
FIG. 1A is a block diagram of video on demand system in accordance with the present invention.

FIG. 1A is a block diagram of a video on demand (VOD) system 100 in accordance with the present invention. VOD system 100 includes control input source 150 and video server 105. Video server 105 includes one or more central control modules ("CCMs") 110, one or more delivery modules ("DMs") 120 and one or more storage modules ("SMs") 130. Because the system is modular and expandable, the number of CCMs 110, DMs 120 and SMs 130 used in a particular application depends on factors such as the number of streams to be delivered and the video storage requirements of the particular application. In one preferred embodiment, video server 105 has a single CCM 110, a single DM 120 and a single SM 130. Further, in order to facilitate modularity and system expansion, video server 105 is preferably a rack-mounted system wherein each subcomponent (CCM 110, DM 120, and SM 130) is adapted for rack-mounting.

Control input source 150 is any input source which generates control signals to control the retrieval and display of stored video information (video data). Exemplary control input sources 150 include a keyboard, a remote control device, a mouse, a complete computer system or a network of client computers linked to video server 105. In the preferred embodiment, control input source 150 is a network of video clients 101 coupled to video server 105. Each video client 101 is a computer which generates video control signals. Thus, video clients 101 are used to select and control the playback of a video from the videos provided by VOD System 100 by generating video request and control signals which are coupled to video server 105. The video clients 101 are preferably linked to video server 105 using an ethernet network. It should be understood, however, that in accordance with the invention, other means of linking video clients 101 to video server 105 may be used. For example, video clients 101 may be linked to video server 105 using a local area network, a radio communication link, an optical link or any other communication means.

Referring still to FIG. 1A, SM 130 includes one or more storage devices 131. Storage devices 131 are each preferably a high capacity storage medium such as a conventional hard disk drive, a CD-ROM drive, or a tape drive and the like. In a preferred embodiment, storage devices 131 are high capacity (ranging from 4 to 9 gigabytes) disk drives manufactured by Seagate, Inc. SM 130 stores a plurality of video objects (video sequences). In one embodiment, the video objects are each feature length video movie. In other embodiments, the video objects are other forms of video content. It should be understood that the term "video" includes content having both audio and visual portions or exclusively audio content or exclusively visual content, as well as other types of digital content. Thus, the term video includes digital music recordings, voice recordings, silent visual segments and the like.

The preferred embodiment stores each video object in accordance with an inventive RAID technique that uses "striping" and which is discussed below. With striping, each video object is divided into a plurality of "video stripes" and each video stripe is stored on a different storage device 131. Further, each video stripe is further subdivided into a plurality of 128 kbyte data chunks called "data blocks."

CCM 110 is a high performance personal computer motherboard running a robust multi-threading operating system (preferably the Sun Microsystems SOLARIS operating system) on its CPU 112 (preferably a PENTIUM microprocessor manufactured by the Intel Corporation). The motherboard is manufactured by ASUSTek Computer Inc. and is installed in a rack-mountable chassis manufactured by MiTAC Industrial Corporation. The motherboard also includes a peripheral control interface (PCI) bus for coupling to peripheral devices such as SCSI and ethernet controllers.

Each CCM 110 includes initiators 111 and 113 to facilitate communication with between CCM 110 and SM 130 and between CCM 110 and DM 120 respectively. Initiators 111 and 113 are conventional SCSI controller cards manufactured by Adaptec, Inc., of Milpitas, Calif. and are coupled to CPU 112 using the PCI bus. CCM 110 also includes memory buffers 114. Memory buffers 114 are allocated memory spaces within dynamic random access memory (DRAM 232 (shown in FIG. 1B)) coupled directly to CPU 112. Preferably, memory buffers 114 are each 128 kbytes of memory and thus each memory buffer 114 is sized to store an entire data block.

DM 120 is also preferably a high performance personal computer motherboard manufactured by Tyan Computer Corporation. The motherboard is installed in a rackmountable chassis manufactured by MiTAC Industrial Corporation. The motherboard additionally includes a conventional peripheral control interface (PCI) bus. Each DM 120 has a target 124, a CPU 125, a plurality of video processors 121 and memory buffer 126. CPU 125 is preferably a PENTIUM processor manufactured by the Intel Corporation. Target 124 is a conventional "target mode capable" SCSI controller card such as an ABP-940 model SCSI controller manufactured by Advansys, Inc. of San Jose, Calif. and is coupled to CPU 125 using the PCI bus. "Target mode capable" means capable of being adapted to operate in a target mode to receive data from a SCSI controller which is operating in an initiator mode. Advantageously, use of a conventional SCSI controller card for interfacing CCM 110 and DM 120 allows CCM 110 to write data to DM 120 as if CCM 110 were writing to a conventional disk drive thereby reducing system cost and complexity and enhancing system reliability.

Video processors 121 receive video data (that form a video stream) from memory buffer 126 under the control of CPU 125 and then process each video stream for delivery to a client 101. In a preferred embodiment, video processors 121 are conventional Motion Pictures Expert Group (MPEG) decoders such as a conventional MPEG-1 decoder manufactured by Zoran Corporation of Santa Clara, Calif., or a conventional MPEG-2 decoder manufactured by Matrox Electronic Systems, LTD of Canada. Selection of either an MPEG-1 or MPEG-2 decoder is determined by the compression technique used to compress the video data stored in SM 130.

One preferred embodiment has twelve video processors 121 on DM 120. Preferably, each video processor 121 operates on a single video stream. Additionally, in the preferred embodiment, the output of each video processor 121 is an NTSC/PAL composite signal for direct coupling to a video monitor (at client 101) compatible with either the NTSC and PAL standards.

In other embodiments, video processors 121 do not perform MPEG decompression but instead perform other types of decompression. In still other embodiments, video processors 121 process each video stream for interfacing to a network such as an ethernet, ATM, PSTN network and the like or to interface with another client delivery means. In these embodiments, video decompression, if any, is performed either on the DM 120, at the client location or at another point along the video stream path.

CCM 110 is interconnected to SMs 130 by a SCSI (small computer serial interface) bus 141. Similarly, CCM 110 is coupled to each DM 120 by a SCSI bus 142. The SCSI communication is handled by initiators 111 and 113 located on CCM 110 along with corresponding SCSI controllers (target 124 on DM 120 and SCSI circuitry (not shown) associated with SM 130) that are components of the SM and of the DM. The SCSI controllers on the SM 130 and DM 120 operate in a "target" mode. Advantageously, the SCSI interface with the DM 120, is a cost effective interface mechanism and allows each CCM 110 to deliver data to the DM 120 as if it were writing data to a hard disk drive or other conventional SCSI compatible device.

Although the preferred embodiment uses a single initiator 113 to communicate with SMs 130, other embodiments may employ a plurality of initiators 113 to meet the interface requirement when a greater number of SMs 130 are used in a VOD system 100. Similarly, although the preferred embodiment uses a single initiator 111 to communicate with DMs 120, other embodiments may employ a plurality of initiators 111 to meet the interface requirement when a greater number of DMs 120 are used in a VOD system 100.

Although the preferred embodiment uses a single CCM 110, the principles of the present invention apply to VOD systems 100 incorporating multiple CCMs 110. Incorporating multiple CCMs 110 in video server 105 advantageously allows the VOD system 100 to be configured for redundant operation thereby improving system reliability and fault tolerance. Additionally, configuration with multiple CCMs 110 increases system bandwidth thereby increasing the maximum number of video streams generated by VOD system 100.

One preferred system configuration includes a single CCM 110 servicing nine DMs 120 wherein each DM 12C has twelve video processors 121. This preferred configuration thus generates up to one hundred and eight (108) video streams simultaneously. Another configuration uses eight rather than twelve video processors 121 and thus delivers up to ninety-six (96) video streams.

Each CCM 110 receives and processes video control commands from one or more clients 101. Video control commands include for example, PLAY, STORE, PAUSE, FAST FORWARD, REWIND, SELECT A VIDEO and the like. More specifically, CPU 112 on CCM 110 decodes the received video control commands and controls the operation of SM 130 and DM 120 to implement the decoded command. CCM 110 performs such functions as managing and scheduling the asynchronous transfer of video data in and out of memory buffers 114.

Conventionally, video server systems (i.e., video on demand systems) fall into one of two categories: streaming systems and non-streaming systems. Streaming systems respond to a playback request by delivering an apparently continuous video stream until another user command is received to alter playback (i.e. PAUSE, STOP etc.) or until the end of the file is reached. In non-streaming systems, the video server does not deliver an ongoing video stream but instead delivers video chunks or video segments in response to client requests. Preferably, requests from a client 101 must occur often enough and must be serviced quickly enough to generate an apparently continuous and "real time" video stream for a user. The preferred implementation of VOD system 100 is a streaming-type video server. Streaming-type video servers have the advantage of requiring less interaction between a client 101 and video server 105 as compared to non-streaming type video servers. Thus, they tend to be less prone to error, can accommodate a greater number of channels and require less complexity at a client 101.

VOD System 100 uses a multiple buffer scheme to deliver real time video streams. Under the control of CPU 112, data is transferred from SM 130 to memory buffers 114, preferably in 128 kbyte chunks. That data is next transferred in smaller chunks (preferably 32 kbyte chunks) to memory buffers 126 on DM 120, again under the control of CPU 112. Now, under the control of CPU 125, data is transferred in still smaller chunks (preferably 32 bytes) to each video processor 121. Each video processor 121 processes the 32 bytes chunks of data to generate a video stream for delivery to a client location.

Preferably, data transfers between SMs 130 and CCM 110 and between CCM 110 and DM 120 are executed using direct memory access (DMA) mode of transfer to obtain faster memory transfers and to avoid using CPU operation during the transfer.

Advantageously, because DM 120 interfaces with CCM 110 in a target mode (using a SCSI interface in a target mode) the video data and accompanying control commands are sent to DM 120 using an address scheme. Each video stream is assigned to a specified address range on DM 120. Thus if CCM 110 is writing video data for a particular data stream, the destination address on DM 120 is used to inherently specify the particular data stream. Similarly, control information such as GO, END DECODING and PAUSE associated with each video stream is written to specific pre-specified addresses which are each mapped to a particular video stream. The address mapping of each video stream and its associated control information is predefined. Alternatively, an address map mapping each video stream data and the control information associated with each video stream is received from DM 120 during system start up and then is stored on CCM 110.

Figure 1B:
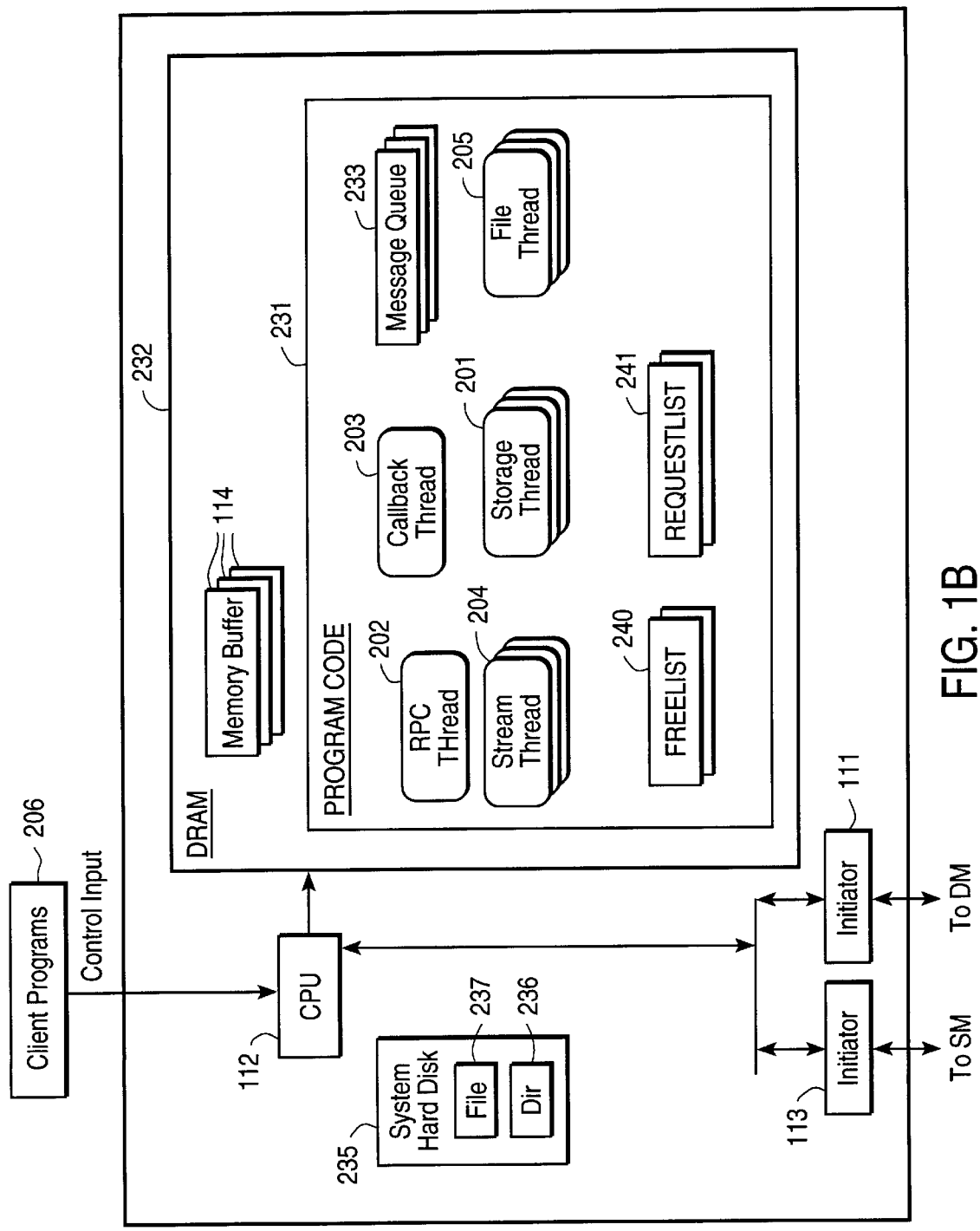
FIG. 1B is a block diagram of a CCM, including program modules (processing threads), as used in the video on demand system of FIG. 1A.

FIG. 1B is a block diagram of a CCM 110 in accordance with the present invention. In order to service the control commands received from the plurality of clients 101, CCM 110 performs multi-task processing using program code 231 stored in DRAM 232 coupled to CPU 112. DRAM 232 also forms memory buffers 114 (also shown in FIG. 1A). DRAM 232 is conventional DRAM mounted in memory expansion slots located on the conventional computer motherboard included in CCM 110. Program code 231 includes multi-processing threads 201–205 that are executed by CPU 112. The multiprocessing threads 201–205 include remote procedure call (RPC) thread 202, callback thread 203, stream threads 204, storage threads 201 and file thread 205. Each thread is an active path through the computer program executed by CPU 112.

Referring still to FIG. 1B, CCM 110 also includes a system hard disk 235 local to CCM 110. System hard disk 235 stores the program code 231 for loading into DRAM 232. System hard disk 235 additionally stores a server configuration file 237 and a video catalog subdirectory 236.

Figure 2A:
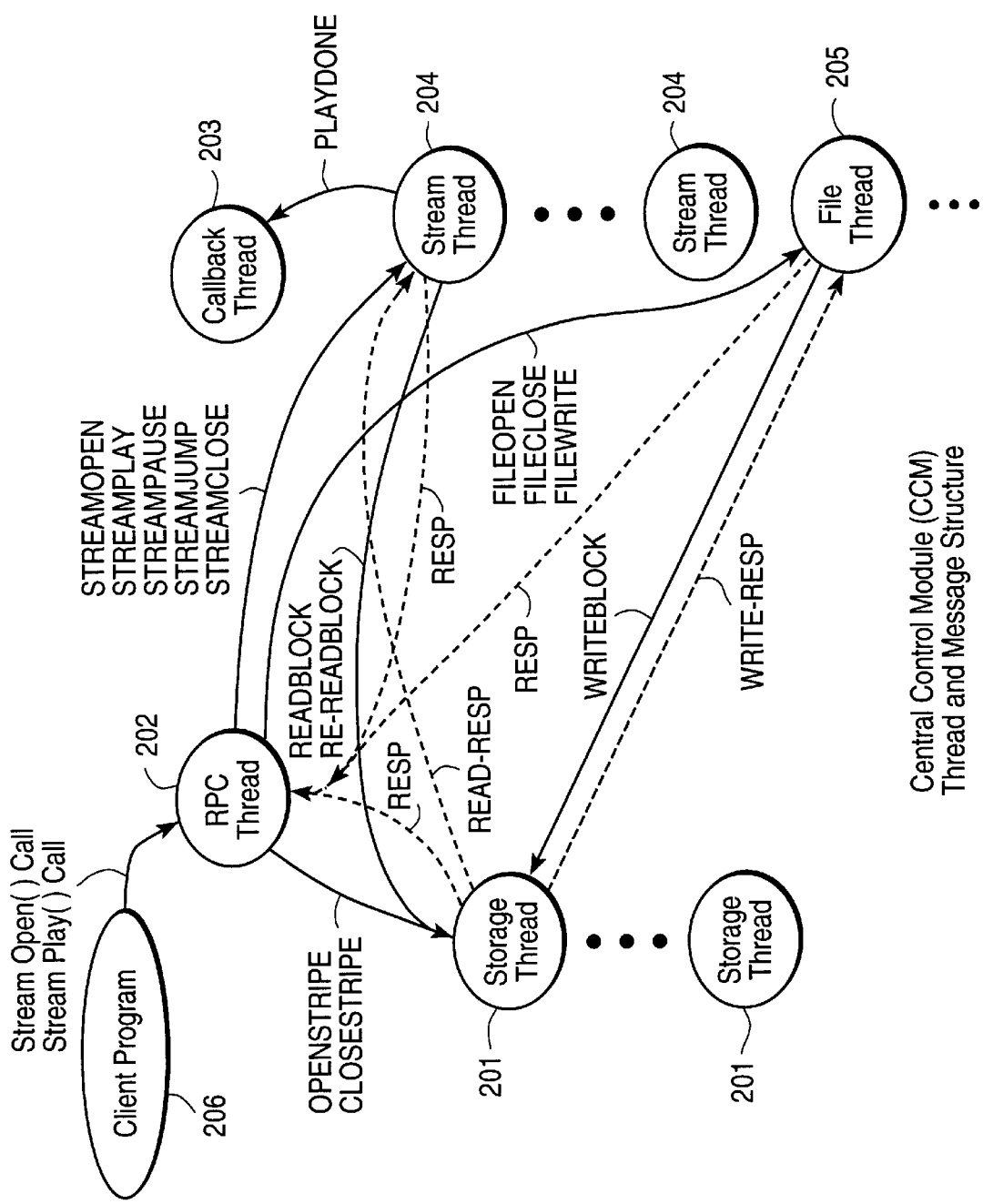
FIG. 2A is a state diagram showing the interaction of the processing threads used in the CCM shown in FIG. 1B.

FIG. 2A is a state diagram showing the relationship between the multiprocessing threads 201–205. Together, multiprocessing threads 201–205 receive and process function calls generated by client programs 206 (running on clients 101) in order to playback multiple video streams and effect various control commands (i.e. PAUSE, STOP, REWIND etc.) as requested by clients 101.

Remote Procedure Call (RPC) thread 202 provides the application program interface (API interface) to client programs 206 and thus handles receipt of control inputs (function calls) received from client programs 206. CCM 110 generates (executes) a single RPC thread 202 to manage the interface between video server 105 and clients 101.

CCM 110 generates and executes (on CPU 112) a stream thread 204 for each output video stream. Each stream thread 204 manages the playback of a single video stream.

Callback thread 203 is executed by CPU 112 and handles messages generated by the stream thread 204 which are generated as a result of either "end of file" or error conditions. CCM 110 has a single callback thread 203.

File thread 205 is executed by CPU 112 and handles file management including the creation, deletion, writing and reading of video objections. CCM 110 has a multiple file threads 205.

Each storage device 131 is managed by one or more storage threads 201. Storage threads 201 receive message requests from stream threads 204, from file thread 205 and from RPC thread 202, and in turn service the message requests by performing the appropriate disk access and data retrieval functions. The number of storage threads 201 that manage a given storage device 131 is specified in server configuration file 237. Preferably, two storage threads 201 manage each storage device 131.

Referring now back to FIG. 1B, each storage device 131 has an associated message queue 233. The message queues 233 are first-in-first-out (FIFO) message pipes (queues) for storing disk I/O request messages. When a stream thread 204 needs to read video data from a particular storage device 131, the stream thread 204 sends a message (requesting disk I/O) (disk access) to the message queue 233 corresponding to the appropriate storage device 131. Each message includes a deadline field calculated by the stream thread 204 generating the message.

Figure 2B:
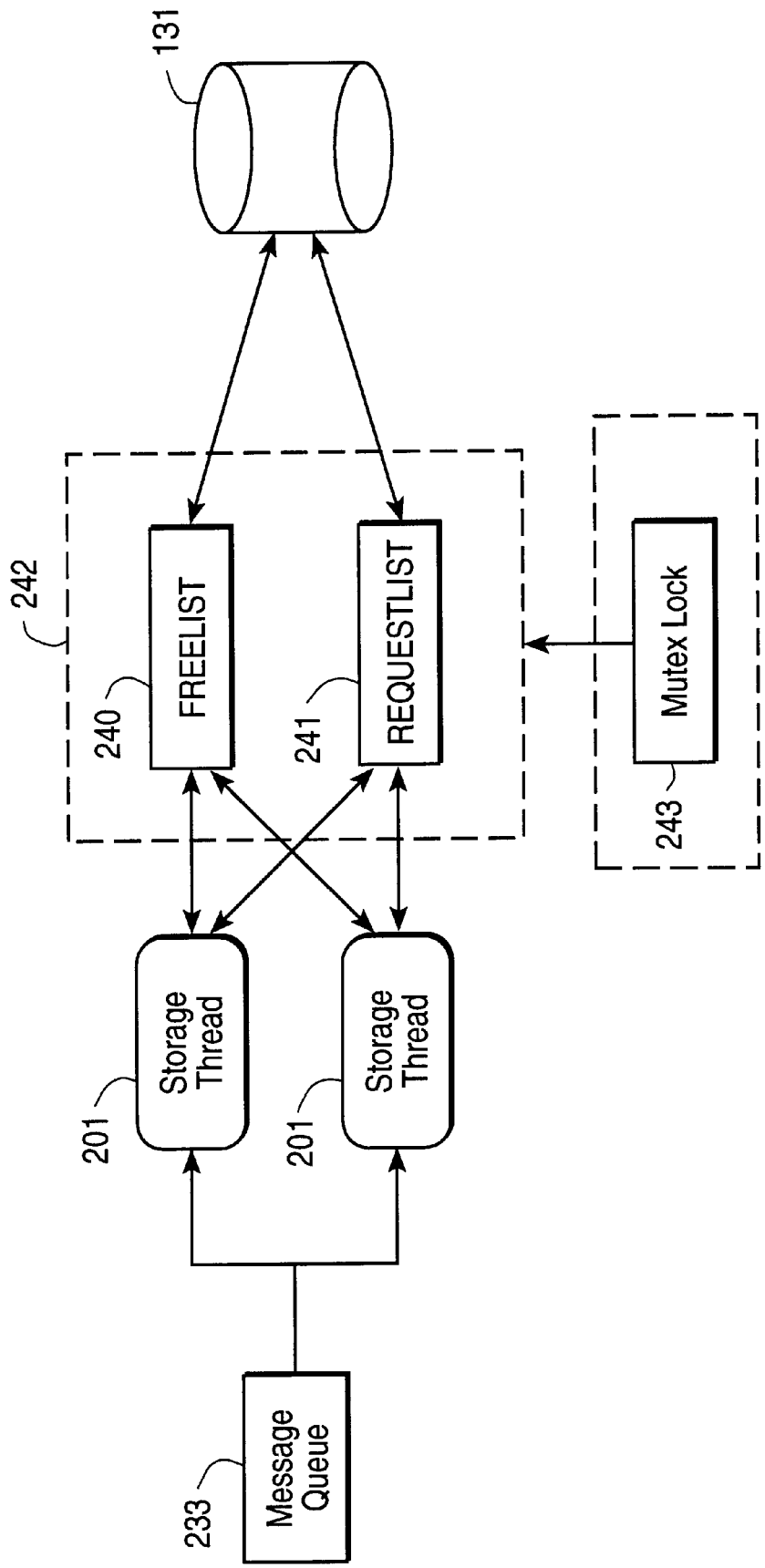
FIG. 2B is a flow diagram of the data structures and program modules used in accessing a storage device.

FIG. 2B is a flow diagram of the data structures and program modules 232 used in accessing a storage device. Program code 232 includes a set of linked list data structures 242. Linked List data structures 242 include FREELIST 240 and REQUESTLIST 241. One FREELIST 240 and one REQUESTLIST 241 are created for each storage device 131. FREELIST 240 is an unsorted linked list of free message storage elements and REQUESTLIST 241 is a linked list of messages sorted in accordance with the deadline field associated with each message. Each storage thread 201 processes a message by first retrieving a storage element from FREELIST 240. Storage thread 201 next retrieves a message from message queue 233 and stores the retrieved message in the storage element. Storage thread 201 and then links the message into REQUESTLIST 241 in accordance with its deadline field.

Figure 2C:
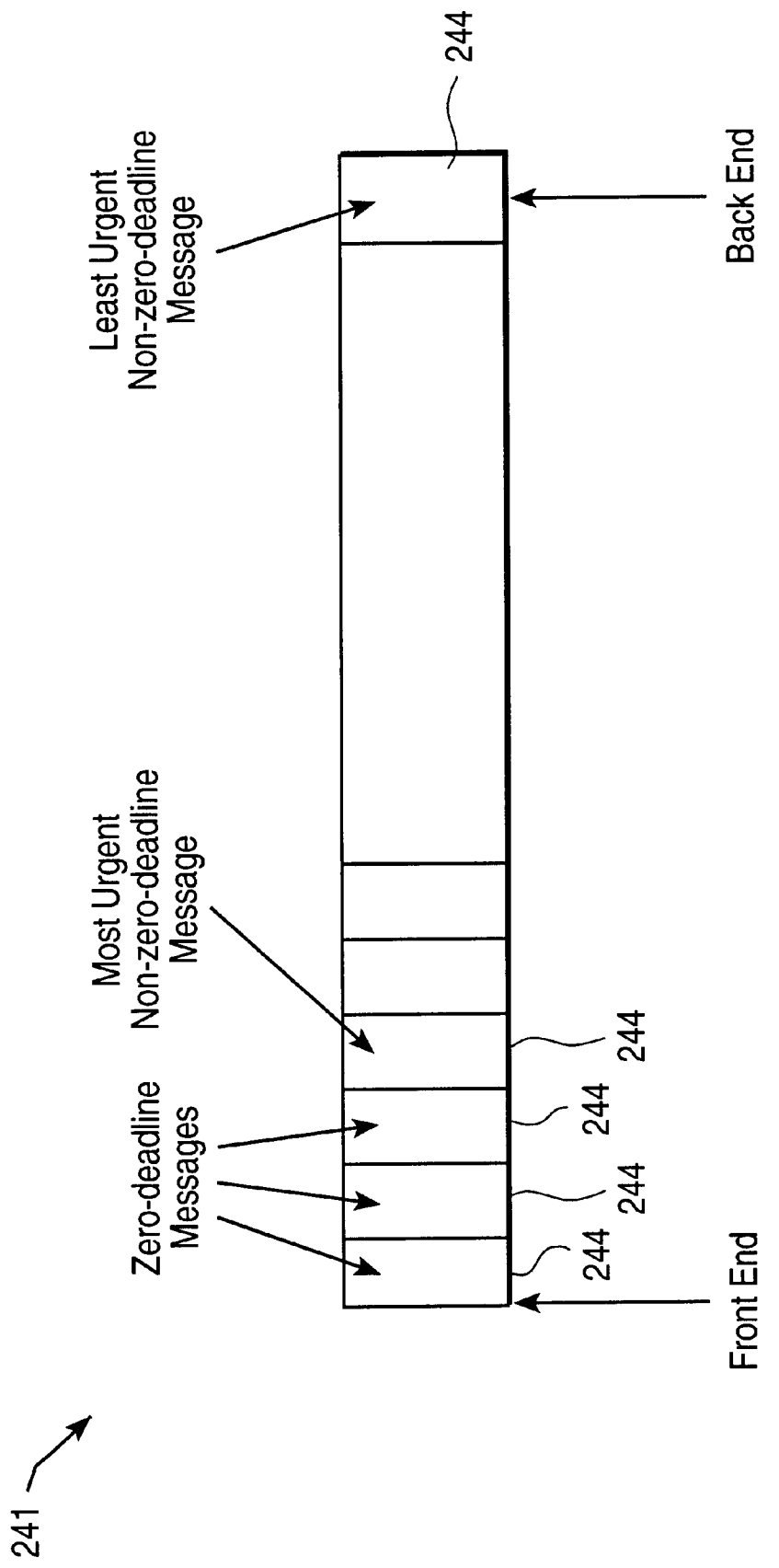
FIG. 2C illustrates a REQUESTLIST shown in FIG. 2B.

FIG. 2C illustrates a REQUESTLIST 241 in accordance with the present invention. REQUESTLIST 241 is a linked list of messages 244 arranged such that the front end of REQUESTLIST 241 has zero-deadline messages 241. The non-zero deadline messages 241 are stored after the zero deadline messages and descend in urgency such that the least urgent non-zero-deadline messages 244 are shared at the back end of REQUESTLIST 241.

The REQUESTLIST 241 and the FREELIST 240 together have a mutually exclusive (mutex) lock 243 to serialize the accesses to the REQUESTLIST 241 and FREELIST 240. The mutex lock 243 is a conventional locking mechanism provided by the operating system.

Description of the Processing Threads

Referring again to FIG. 2A, the CCM 110 remains in an idle state until the RPC thread 202 receives a StreamOpen() call from a client program 206. The StreamOpen() call is a request to open a new video stream for playback. Upon receiving the StreamOpen() call, the RPC thread 202 sends a StreamOpen message to a stream thread 204. The stream thread 204 in turn handles the playback of the video stream just opened.

In handling the StreamOpen message, the stream thread 204 sends a ReadBlock message to each of three storage thread message queues 233 corresponding to the storage devices 131 that store the first three data blocks of the video object to be played back. In the preferred embodiment, three memory buffers 114 are reserved for each playback stream and thus servicing the StreamOpen message will fill the memory buffers 114 associated with the newly opened playback stream.

Each storage thread 201 asynchronously retrieves the ReadBlock message from its message queue 233 and prioritizes the message for processing. When eventually processed, storage thread 201 processes the ReadBlock message by reading the requested data block (the preferred block size is 128 kbytes) from the specified disk and writing the data block into the assigned memory buffer 114. After servicing a ReadBlock message, storage thread 201 sends a READ-RESP message to the stream thread 204 which originated the ReadBlock message.

Storage thread 201 then processes the next most time-critical message in its message queue 233. If however, the message queue is empty, storage thread 201 enters an idle state until a message is sent to its message queue 233.

Figure 3:
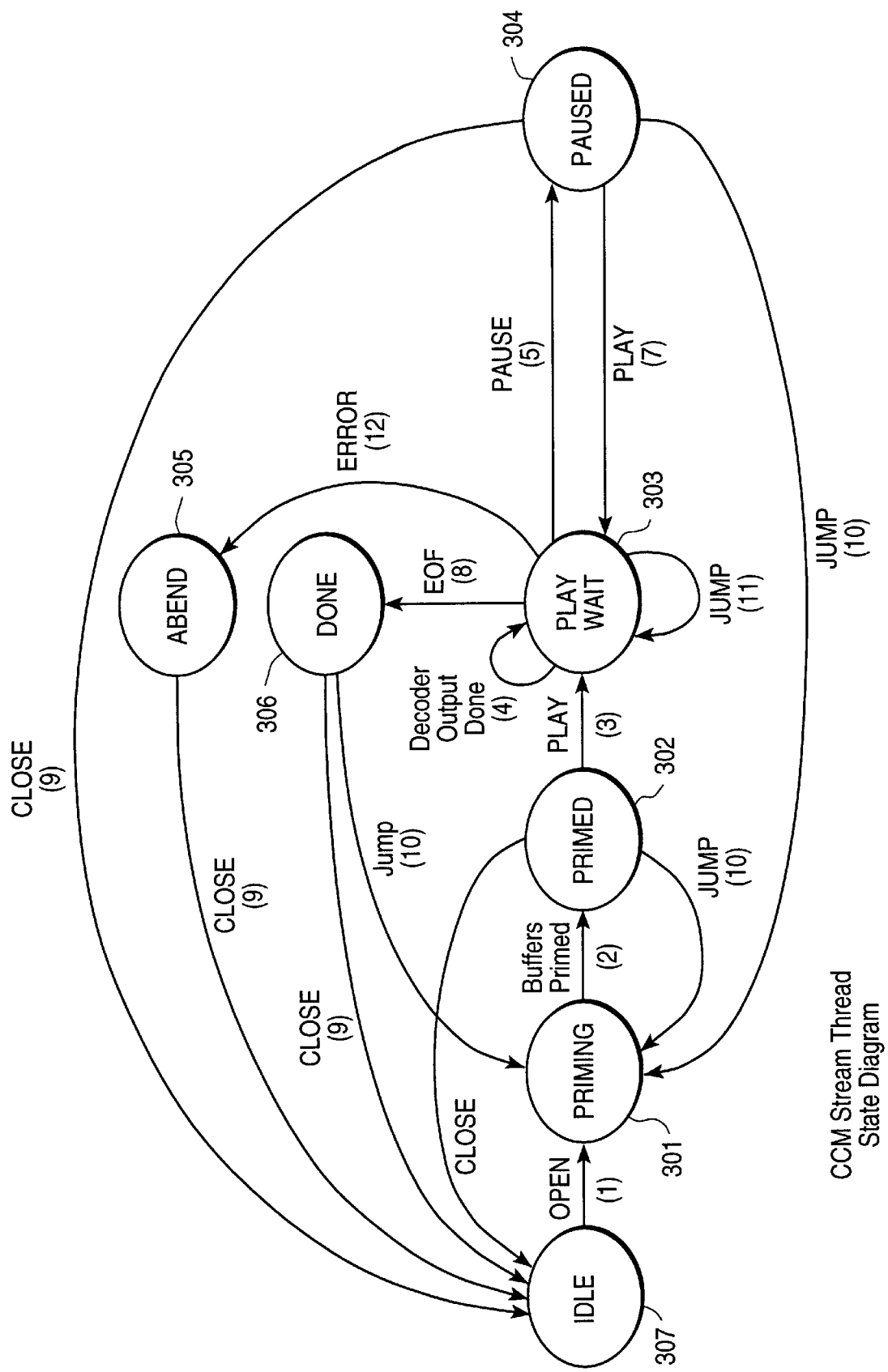
FIG. 3 is a state diagram showing the processing states of the stream threads shown in FIG. 2A in accordance with the present invention.

FIG. 3 is a state diagram of stream thread 204 shown in FIG. 2A Stream thread 204 remains in the IDLE state 307 until receipt of a StreamOpen message.

After sending the ReadBlock messages to the message queues, the stream thread 204 enters the PRIMING state 301. While in the PRIMING state 301 the stream thread 204 waits until a READ-RESP message is received from each storage thread 201 to which a ReadBlock message was sent. The READ-RESP message sent by the storage thread 201 indicates that the storage thread 201 has serviced the Read-Block request. Once all READ-RESP messages are received, the stream thread enters the PRIMED state 302.

Referring now back to FIG. 2A, asynchronously, the RPC thread 202 receives a StreamPlay() call from the client program 206. The RPC thread 202 in turn sends a Stream-Play message to the stream thread 204. The stream thread 204 then handles the playback of the stream.

Referring again to FIG. 3, while stream thread 204 is in the PRIMED state 302, stream thread 204 waits until a StreamPlay message is received from the RPC thread 202. The stream thread 204 handles the StreamPlay message by selecting a start time zone for the stream preferably in accordance with the scheduling protocol discussed below. After a start time zone is selected, playback is initiated by retrieving the first sub-block (32 kbytes) of video data from memory buffer 114 and sending the sub-block to the DM 120 containing the destination output port. After sending the data sub-block, the stream thread 204 enters the PLAYWAIT state 303.

While in the PLAYWAIT state 303, stream thread 204 determines whether any new messages have arrived from either RPC thread 202 or from any of the storage threads 201 and processes any received messages. Messages which may be received include the StreamPause message, the Stream-Jump message, and the READ-RESP message. Each respective message is handled as follows:

(i) If a StreamPause message is sent from the RPC thread 202, then the Stream thread 204 enters the PAUSED state 304.

(ii) If a StreamJump message is sent from the RPC thread 202, then Stream thread 204 discards any data blocks in memory buffer 114 that have not yet been sent to the DM 120. The memory buffers 114 that had been allocated for use by stream thread 204 is next allocated for use by storage thread 201 to store video data (data blocks) retrieved from the new jump to position. After servicing the StreamJump message, stream thread 204 loops in the PLAYWAIT state 303 waiting to receive a next message.

(iii) If a READ-RESP message is sent from a storage thread 201 and if the READ-RESP message indicates that the ReadBlock message has been handled without any error, then the stream thread 204 marks the corresponding memory buffers 114 as ready and then loops in the PLAYWAIT state 303.

(iv) If a READ-RESP message is sent from a storage thread 201 and if the READ-RESP message indicates that the ReadBlock message has encountered an error, then the stream thread 204 sends an ErrorPlay Done message to the Callback thread 203 and enters the ABEND state 305. The callback thread 203, upon receiving the ErrorPlay Done message makes a call back to the client program 206 which originated the video command to notify the client program 206 of the encountered error in the video stream.

While in the PLAYWAIT state 303, stream thread 204 is additionally controlled by a timer in order to maintain an isochronous video stream. Isochronous means non-bursty or "at a near constant rate." In order to maintain an isochronous video stream, each 32K byte data sub-block is sent to the DM 120 within a specified time interval. Upon transferring each data sub-block to DM 120, stream thread 204 determines whether the data sub-block was the last sub-block in memory buffer 114. If the data sub-block was the last sub-block, stream thread 204 marks the memory buffer 114 as "available" and sends a ReadBlock message to the appropriate storage thread 201 to initiate the retrieval of additional video data (a 128 kbyte data block) from a storage device 131. Stream thread 204 additionally determines whether the end of the video file has been reached. If the end of the video file has been encountered, then a stream thread 204 sends a Normal Play Done message to the callback thread 203 and enters the DONE state 306. The callback thread 203 in turn sends a call back to the originating client program 206 to notify the client program 206 of the normal ending of the video stream. If however, the end of the video file has not been reached, stream thread 204 loops in the PLAYWAIT state 303.

While in the DONE state 306, stream thread 204 processes messages received from the RPC thread 202. If a StreamJump message is sent from the RPC thread 202, (as a result of a StreamJump() call received from a client program 206), stream thread 204 sends the address of memory buffers 114 to the storage thread 201 for the retrieval of video from the new jump-to position on the stored video file. After sending the address of memory buffers 114, stream thread 204 enters the PRIMING state 301. If a StreamClose message is sent by the RPC thread 202 (as a result of a StreamClose() call from a client program 206), the stream thread 204 sends a command to notify the DM 120 associated with the stream of the closing of the stream playback. Stream thread 204 then enters the IDLE state 307.

When in the PAUSED state 304, the stream thread 204 processes messages sent by the RPC thread 202. If a StreamJump message is sent from the RPC thread 202 (as a result of a StreamJump() call sent by the client program 206), the stream thread releases any data in the memory buffers 114 and allocates the freed memory space to the corresponding storage threads 201 for retrieval of video data starting at the new jump-to position in the video file. The stream thread 204 then enters the PRIMING state 301.

If a StreamClose message is sent from the RPC thread 202 (as a result of a StreamClose() call from the client program 206), the stream thread notifies the DM 120 associated with the stream of the closing of the stream playback. The stream thread 204 then enters the IDLE state 307.

If a StreamPlay message is sent from the RPC thread 202 (as a result of a StreamPlay() call from the client program 206), the stream thread 204 selects a start time slot for the video stream and after the time slot arrives sends the current block of 32 k bytes of video disk from the memory buffer 114 (on CCM 110) to the DM 120 containing the destination port for the video stream. The stream thread 204 next enters the PLAYWAIT state 303.

When in the ABEND state 305, stream thread 204 processes the StreamClose message from the RPC thread. If a StreamClose message is sent from the RPC thread 202 (as a result of a StreamClose() call from the client program 206), the stream thread 204 notifies the DM 120 associated with the stream that the stream playback is dosed. The stream thread 204 next enters the IDLE state 307.

Stream Thread Prioritization of Message Requests

VOD system 100 uses a priority scheme to schedule the handling of messages requesting disk input and output (I/O) requests that are sent from multiple stream threads 204 to each storage thread 201. The priority scheme, preferably, ensures that all messages will be completed (handled) so that all requesting stream threads 204 will be able to maintain contiguous playback of their respective video streams.

In accordance with the priority scheme, each message has an associated deadline field. When a stream thread 204 sends a message (a ReadBlock message) to a storage thread 201 requesting disk I/O in order to fill a buffer on CCM 110, the stream thread 204 calculates a deadline for the message and sends the deadline along with the message (in the deadline field associated with the message) to storage thread 201. The deadline is dependent upon the current state of the stream thread 204. The deadline is an integer number ranging from zero to a maximum value. Messages having no deadline are given "zero" deadline values, otherwise messages are assigned deadline values corresponding to their urgency wherein messages having larger deadline values are less urgent and ones with smaller values are more urgent.

During normal playback, i.e. during the PLAYWAIT state 303, the deadline is calculated by adding the data consumption time (i.e., time required to playback video data) in all memory buffers 114 associated with the stream to the start time associated with the most recent write of data to DM 120 by stream thread 204. Preferably, the data consumption time is computed by multiplying the size of each memory buffer 114 by the number of memory buffers 114 associated with the video stream and by then dividing the product by the output data rate (i.e., buff_size * number_of_buffers/data_rate).

During initial priming of buffers before a stream playback starts, (i.e. during the PRIMING state 301) and during the PRIMED state 302, the deadline is set to zero indicating that the message has no absolute deadline and that the message should be serviced provided that such servicing will not cause other messages in the message queue 233 to miss their deadlines.

When the stream thread 204 is in the PAUSED state 304 and a StreamJump() message is received by the stream thread 204, the stream thread 204 discards the data in the memory buffers 114 associated with stream thread 204. Stream thread 204 then sends the address of memory buffers 114 to the appropriate storage threads 201 for filling with data retrieved from the new ("jump-to") position in the stored video object. The deadline associated with the StreamJump() message is "zero" indicating that the message has no absolute deadline and that the message should be serviced provided that such servicing will not cause other messages in the message queue 233 to miss their deadlines.

If a StreamJump() message is received by the stream thread 204 when the stream thread 204 is in the normal playback mode, i.e. during the PLAYWAIT state 303, the stream thread 204 discards the data in the memory buffers 114 associated with the particular stream thread 204 and which contain data having a deadline later than the current time plus the storage thread 201 response time. The stream thread 204 then sends the address of the discarded memory buffers 114 to the appropriate storage threads 201 for filling with data from the new video position (i.e. the jump-to location in the video file) while retaining the same deadlines as had been associated with the previously stored data.

Storage Thread Processing

The storage threads 201 are created during startup of CCM 110 and manage access of storage devices 131. Referring now back to FIG. 2B, access of each storage device 131 is controlled by the linked lists 242 (REQUESTLIST 241 and FREELIST 240) associated with each storage device 131. The number of storage threads 201 managing each storage device 131 is determined by reading the configuration file 237. If more than one storage thread 201 is created for each storage device 131, a locking mechanism (mutex lock 243) is used for accessing the REQUESTLIST 241 and FREELIST 240.

Figure 4:
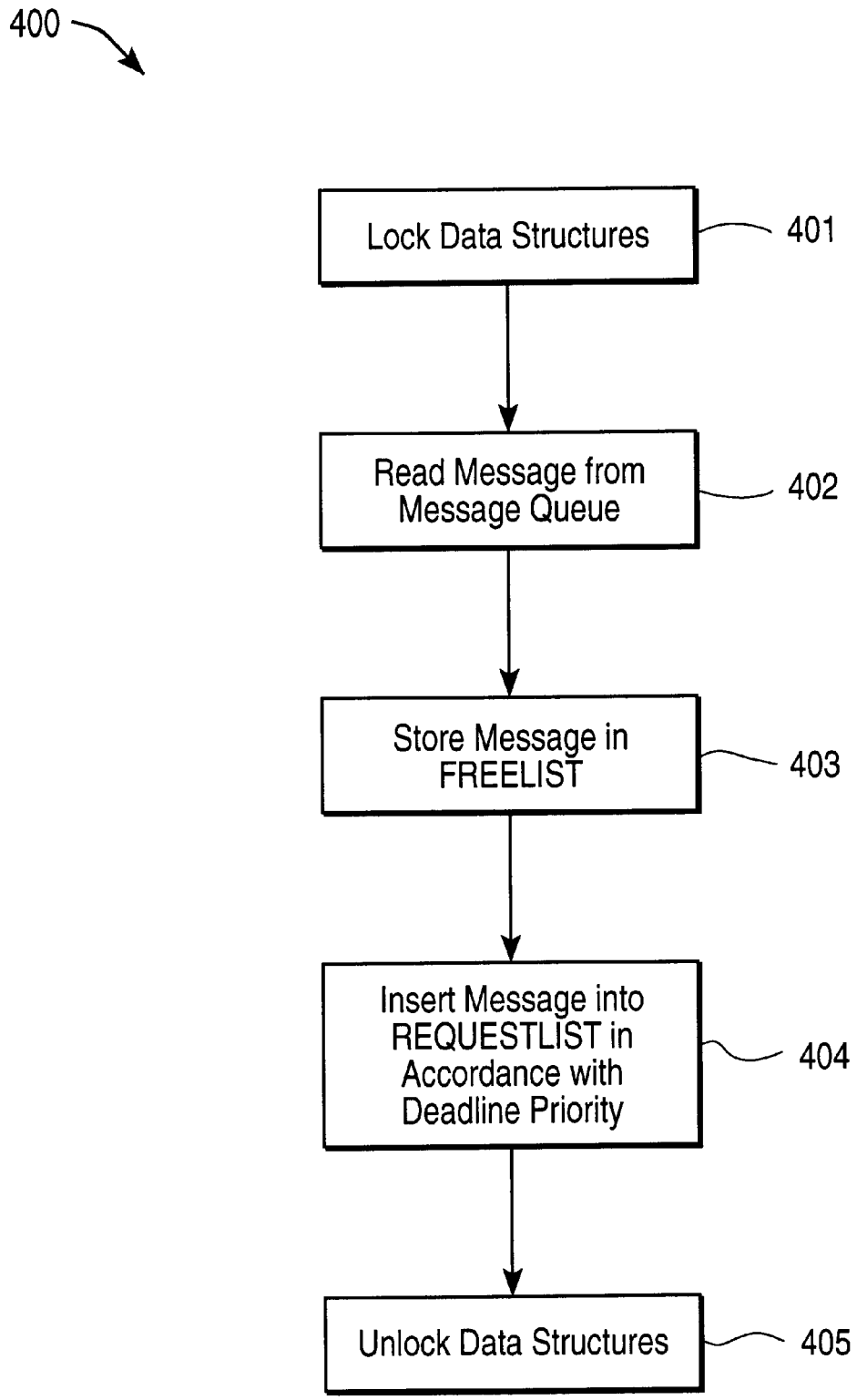
FIG. 4 is a flow diagram of the message queue processing performed by each storage thread.

FIG. 4 is a flow diagram of the message queue processing 400 performed by each storage thread 201. Storage thread 201 initiates processing by determining if there is more than one storage thread 201 associated with storage device 131. If there is more than one storage thread 201 associated with storage device 131, the current storage thread 201 obtains the mutex lock 243 associated with the storage device 131 to lock 401 the linked list 242 (REQUESTLIST 241 and FREELIST 240).

Once the mutex lock 243 is secured (and linked list 242 is locked 401) storage thread 201 processes 402 a message. Storage thread 204 next removes (unlinks) a message storage element from FREELIST 240. Then the storage thread 201 stores 403 the retrieved message in the unlinked message storage element and inserts 404 it into REQUESTLIST 241 in accordance with the deadline associated with the message. Specifically, if the message being inserted (the "new message") has a non-zero deadline, storage thread 201 starts searching the REQUESTLIST 241 from the back end (i.e., the end having the least urgent non-zero deadlines) and inserts the new message into REQUESTLIST 241 immediately after the first message that has an earlier deadline than the new message. If none of the messages in REQUESTLIST 241 has an earlier deadline than the new message, the new message is inserted at the beginning of the REQUESTLIST 241.

If, however, the new message has a zero deadline, storage thread 201 starts searching from the front end of REQUESTLIST 241 (i.e., from the end having the most urgent deadlines) and the new message is inserted into REQUESTLIST 241 immediately before the first message that has a non-zero deadline. If none of the messages already in REQUESTLIST 241 has a non-zero deadline, the new message is inserted at the end of the REQUESTLIST 241. After the new message is inserted into REQUESTLIST 241, storage thread 201 next releases the mutex lock to unlock 405 the linked lists 242. The storage thread 201 repeats the message queue processing 400 processing until the message queue 243 is empty. Storage thread 201 then proceeds to process the messages prioritized in the REQUESTLIST 241.

Figure 5:
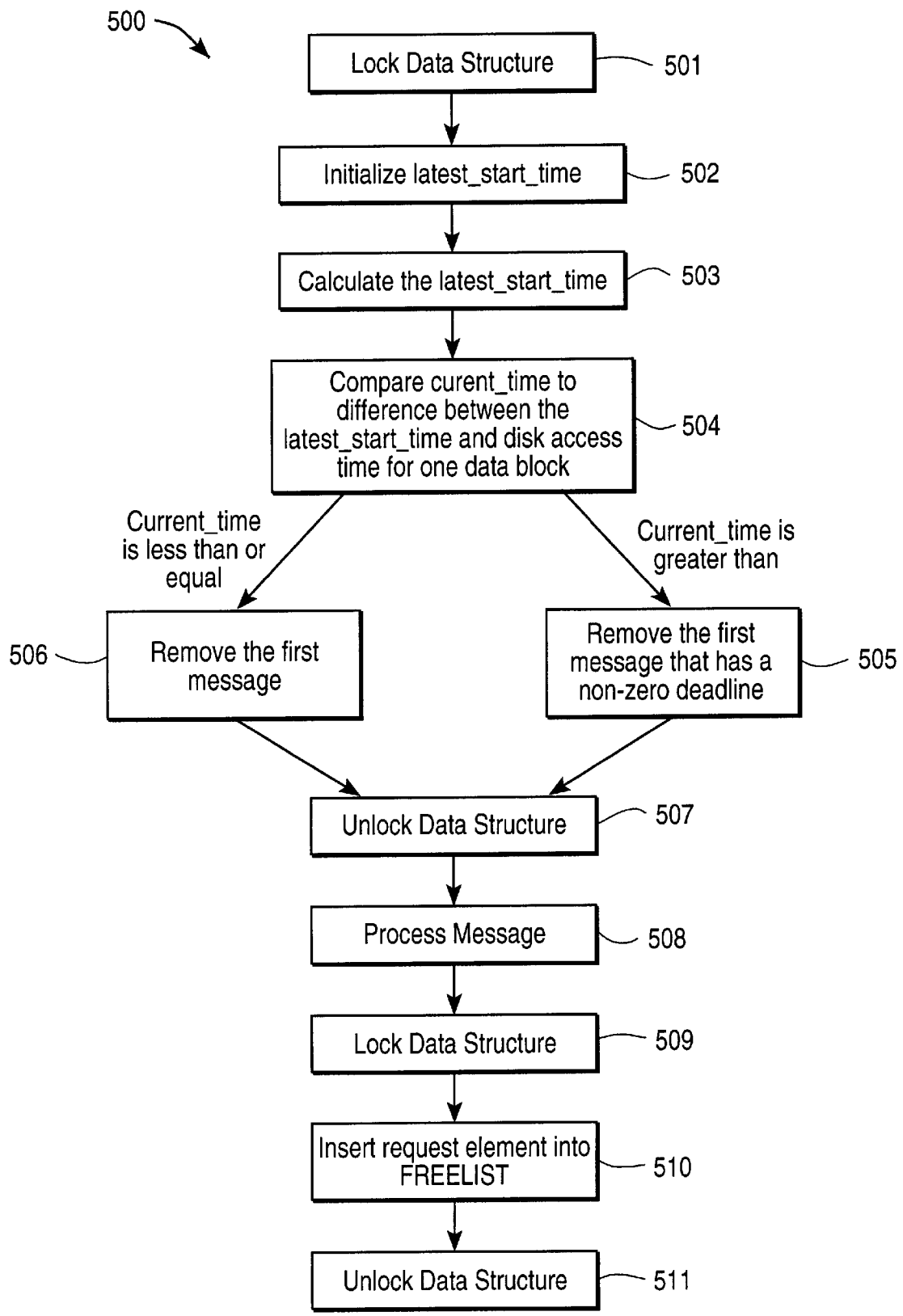
FIG. 5 is a flow diagram of storage thread processing of messages in the REQUESTLIST.

FIG. 5 is a flow diagram of the storage thread 201 processing 500 of the prioritized messages in the REQUESTLIST 241.

If there is more than one storage thread 201 for the storage device 131, the current storage thread 201 obtains the mutex lock associated with the storage device 131 to lock 501 the linked list data structures 241 (FREELIST 240 and REQUESTLIST 241).

After locking 501 the data structures, storage thread 201 next determines whether there is sufficient time to service zero deadline messages in the REQUESTLIST 241 without causing any of the non-zero deadline messages to miss their respective deadlines. Storage thread 201 makes this determination by calculating 503 a latest_start_time for handling the non-zero deadline messages in REQUESTLIST 241. The latest_start_time is iteratively calculated by starting at the end of the REQUESTLIST 241 having the least urgent non-zero deadlines and then for each message, calculating the latest_start_time by subtracting the expected disk access (disk I/O) time from the smaller of the latest_start_time calculated for the previous message and the message deadline associated with the current message.

In calculating the latest_start_time, the latest_start_time is first initialized 502 to the largest integer value representable by latest_start_time. Further, the disk access time corresponds to the time required to read one data block (128 kbytes of data) from the particular storage device 131 associated with the REQUESTLIST 241.

Next, storage thread 201 performs a comparison 504 to determine whether, given the calculated latest_start_time, there is sufficient time to handle a zero-deadline message. This determination is performed by comparing 504 the current time to the difference between the latest_start_time and the expected disk access time (the time required to read one data block (128 kbytes of data)) from a particular storage device 131.

If the current time is less than or equal to the difference between the latest_start_time and the expected disk access time, then there is sufficient time to handle a zero-deadline message and still meet the latest_start_time requirement. Thus, upon this condition, the first message in the REQUESTLIST is removed 506 for processing. This first message will either be a zero deadline message or the most urgent (i.e., smallest deadline) message.

If, however, the current time is greater than the difference between the latest_start_time and the expected disk access time then there is insufficient time to handle a zero deadline message and still meet the latest_start_time requirement. Thus, upon this condition, the first non-zero deadline message is REQUESTLIST 241 is removed 505 for processing.

After removing (either 505 or 506) a message for processing, storage thread 201 unlocks 507 the linked list data structures 242 and then processes 508 the message. After processing 508, the storage thread 201 then locks 509 the linked list data structures 242 and inserts 510 the message storage element occupied by the just processed 508 message into FREELIST 240. After insertion 510, the linked list data structures 242 are unlocked 511.

After completing storage thread processing 500, storage thread 201 then returns to perform message queue processing 400 as shown in FIG. 4 to retrieve any messages written to message queue 233 since the start of storage thread processing 500.

Storage Module Data Structure and Access Mechanism

VOD system 100 uses a hybrid file management mechanism for managing the storage of video objects. The hybrid mechanism incorporates both the file system services provided by the operating system running on CCM 110 and raw disk access methods in order to simplify the task of managing the large number of named video objects (i.e. video files) while fully utilizing the maximum performance bandwidth of raw disk devices.

Generally, the size of the video object itself is very large compared with the control information (e.g., video attributes, date-time of creation, storage map and the like) associated with the video object. Typically, it is gigabytes for the former, and kilobytes or less for the latter. Additionally, the number of input and output (I/O) activities for the former greatly exceed the number associated with the latter. VOD system 100 uses a raw disk method for storing and accessing video objects themselves. Thus the space requirements are minimized and the performance is optimized by avoiding (bypassing) the space and performance overheads associated with the file system of the operating system.

VOD system 100, however, uses the file system of the operating system to store the control information associated with each video object. Using the file system eliminates the complexity of managing name space mapping of video objects, maintaining directory information, and dynamically allocating and reallocating storage space for control information. Advantageously, software testing, system maintenance, and preparation of future upgrades are simplified. At the same time, the overhead in storage space and performance penalty suffered is minimal due to the relatively small size and low number of I/O requests for the control data as compared to that of video objects.

Referring back to FIG. 1B, the system disk 235 in the CCM 110 contains a video catalog subdirectory 236 and a server configuration file 237.

Video catalog subdirectory 236 is a directory, for example, "/svsdrive/cat," having a plurality of named files wherein each named file corresponds to a video object of the same name stored on SM 130. The named file contains control information such as video attributes, the playback data rate, the maximum number of concurrent users and the like.

Server configuration file 237, for example, "drive-configuration," contains information about the storage allocation of storage devices 131 in SMs 130. Such information includes, for example, the raw device name, the striping segment size and redundancy information. The server configuration file 237 is read on system start up and is used to configure VOD system 100.

Additionally, system disk 235 includes as many mount points as the number of storage devices 131 in SMs 130. During normal operation, the control partition of each storage device 131 is mounted on one of the mount points.

During VOD system 100 configuration, each storage device 131 is formatted into two partitions: the control partition and the data partition.

A file system is created on each control partition during formatting of storage devices 131. Each control partition contains a free space bitmap specifying segment availability on the corresponding data partition.

The control partition also contains a number of named files, each of which contains a space map of a stripe of a video object. A space map maps address information related to each 128 kbyte data block included in a particular video stripe. Thus, a space map is used to locate each 128 kbyte data block of the video stripe on the storage device 131. More specifically, the space map translates the logical block number within the video object stripe to the physical segment number within the data partition on the same storage device 131. The name of a space map file is formed by appending the stripe number to the name of the corresponding video object.

The data partition of each storage device 131 is formatted as a raw disk partition, (i.e., the disk is formatted without any operating system information). The access and storage management of the data partition is completely under the control of the CCM 110. More specifically, the storage threads 201 control the access and storage management of the data partition.

Formatting the Storage Devices in the Storage Module

Storage devices 131 are organized into groups (called striping groups) and each group is assigned a number (called the striping group number). When a video object is divided into video stripes, it is assigned to a specific striping group. Each video stripe within a video object is stored on a separate storage device 131 within the assigned striping group. Each storage device 131 in a SM 130 is specifically formatted for use in VOD system 100.

During the format process, a user specifies storage information including the striping group number, stripe number, raw device address, striping segment size, and the primary/secondary indicator for the disk to be formatted and the like. The user also creates a mount point with a desired naming convention such that "/svsdrive/G2/4," for example, is for striping group 2 and stripe 4 disk.

Next, the "/svsdrive/drive-configuration" server configuration file 237 is opened. If the configuration file 237 does not exist, a new one is created. The user specified storage format information is validated against the configuration file 237. After validation, the new drive name and information are added to the configuration file 237.

Next, the disk is formatted into two partitions. Partition 0 (the control partition) is defined as mountable and a file system is created on Partition 0. Partition 1 (the data partition) is defined as unmountable.

Next, Partition 0 is mounted on the mount point previously generated. Thus a file, such as "freespace.map," is created on Partition 0 as a free space bitmap. The file is then initialized to indicate that all segments in Partition 1 are available (unassigned), except segment 0. Then, Partition 0 is unmounted.

Next, Partition 1 is opened and information such as striping group number, stripe number, mount point for stripe, primary/secondary flag, active disk flag, raw device name for primary disk, raw device name for secondary disk is written in segment 0.

After writing to segment 0, partition 1 and the configuration file are closed.

Storage Module Startup Process

After formatting the storage devices 131, VOD system 100 can be started-up. The start-up process includes reading the server configuration file 237 "/svsdrive/drive-configuration" into DRAM 232 and then validating the configuration information in configuration file 237 by comparing it with the actual hardware configuration.

After validating the server configuration file 237, each disk is initialized by:
  (i) Mounting the control partition (Partition 0) of the disk on its corresponding mount point (for example, "/svsdrive/G3/2");
  (ii) Reading the free space bitmap file from the control partition into memory so that it can be accessed and updated efficiently for space allocation and deallocation during normal operations; and
  (iii) Opening the data partition (Partition 1) of the disk for later normal access to the stripes of the video objects on the disk.

Opening Video Objects

Once VOD system 100 has completed the startup process, video system 100 waits until a client program 206 makes a FileOpen() function call 620 to create a video object. For example, a client program 206 may call 620 the FileOpen() function to create a video object called "xyz".

Figure 6:
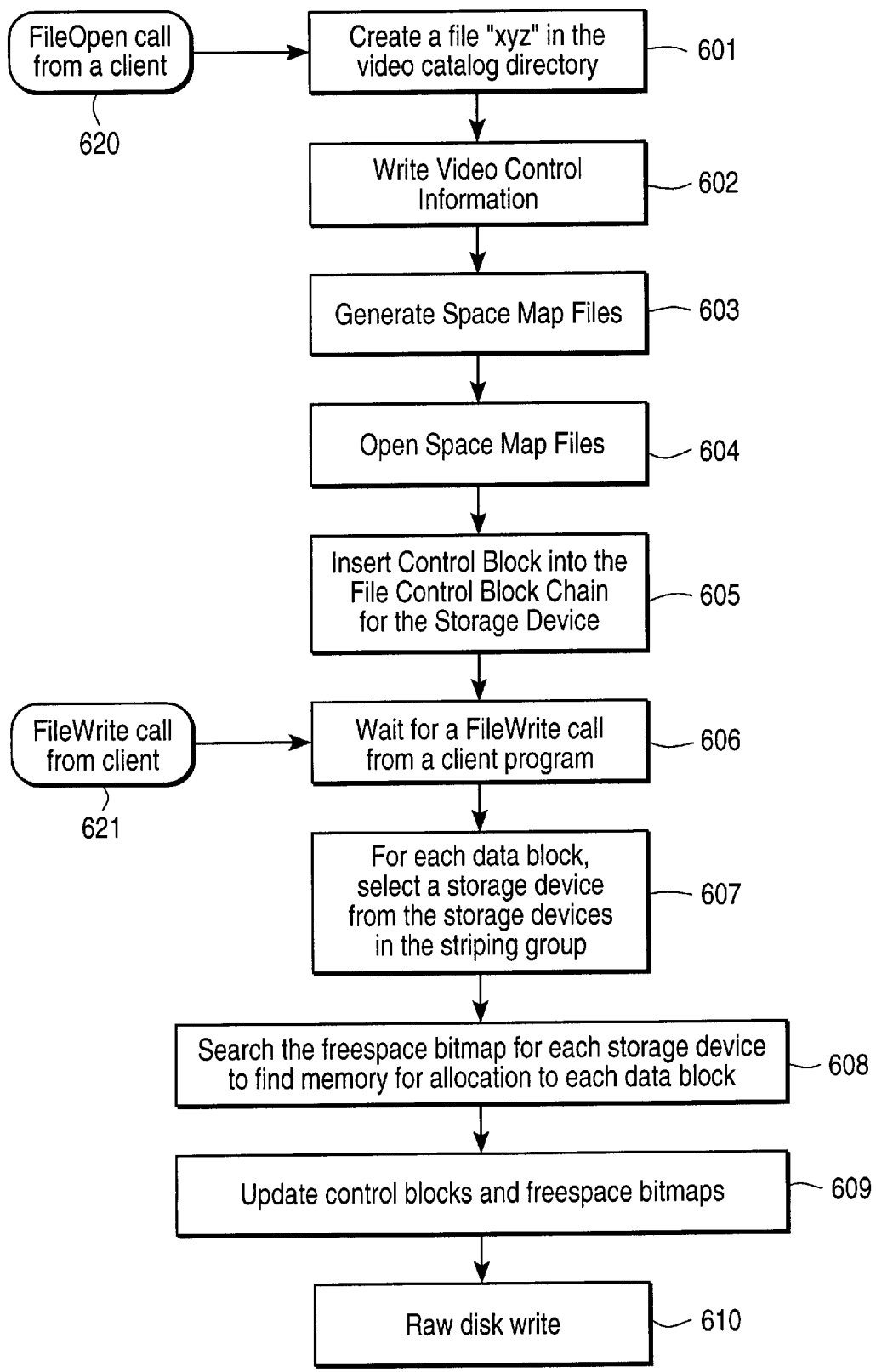
FIG. 6 is a flow diagram of the process of opening a video object for storage on a storage module shown in FIG. 1A.

In response to a FileOpen() call 620, VOD system 100 performs a video open process, shown as a flow diagram in FIG. 6 to open a video object on SM 130.

The video open process starts by creating 601 a video catalog file "xyz" in the video catalog directory 236, for example, in directory "/svsdrive/cat." VOD system 100 next writes 602 control information such as video attributes, data rate, video length, creation date and the like to the video catalog file "xyz."

Next, the process generates 603 space maps for each storage device 131 in the striping group. The space maps translate each data block of a particular video stripe to an address on a storage device 131. The space map resides on the control partition (i.e., Partition 0) of each storage device 131. The name of the space map file is preferably generated by appending the total number of stripes and the particular stripe number to the video object name. For example, if there are six stripes for the video "xyz", the space map file associated with stripe 3 of the video object will be named "xyz,6-3." This creation 603 process is repeated for each stripe of the video object. Next, these space map files are opened 604 for write operations.

Then, for each space map file just created 603 and opened 604, the VOD system 100 inserts 605 a control block into the file control block chain corresponding to the storage device 131. Each storage device 131 has a file control block chain. A file control block chain is a chain of control blocks and is shared in DRAM 232. Control blocks are copies of control information associated with each video stripe including, in particular, a copy of the space map stored on the control partition of the storage device 131. Because the control blocks in the file control block chain are stored in DRAM 232, they have faster access times than the actual space maps shared on each control partition.

The VOD system 100 waits 606 for a FileWrite() function call from a client program 206.

When client program 206 then calls 621 the FileWrite() function to write video object data, the VOD system 100 selects 607, for each data block, a storage device in the particular stripe group for storing the data block. After selecting 607 a storage device 131, VOD system 100 allocates 608 memory for the data block by searching the corresponding freespace bitmap for available space.

After memory is allocated 608 for storing the video object data, CCM 110 updates 609 the file control blocks for each stripe of the video object and also updates 609 the freespace bitmap to reflect the storage allocation. Next, CCM 110 issues raw disk write operations 610 to write the video object data to Partition 1 of each storage device 131 that is in the stripe group according to the space maps. After writing 610 all the data blocks, the client program 206 calls the FileClose() function. Upon receiving the FileClose() function call, VOD system 100 updates the space maps stored on each storage device 131.

Video Object Playback

Figure 7:
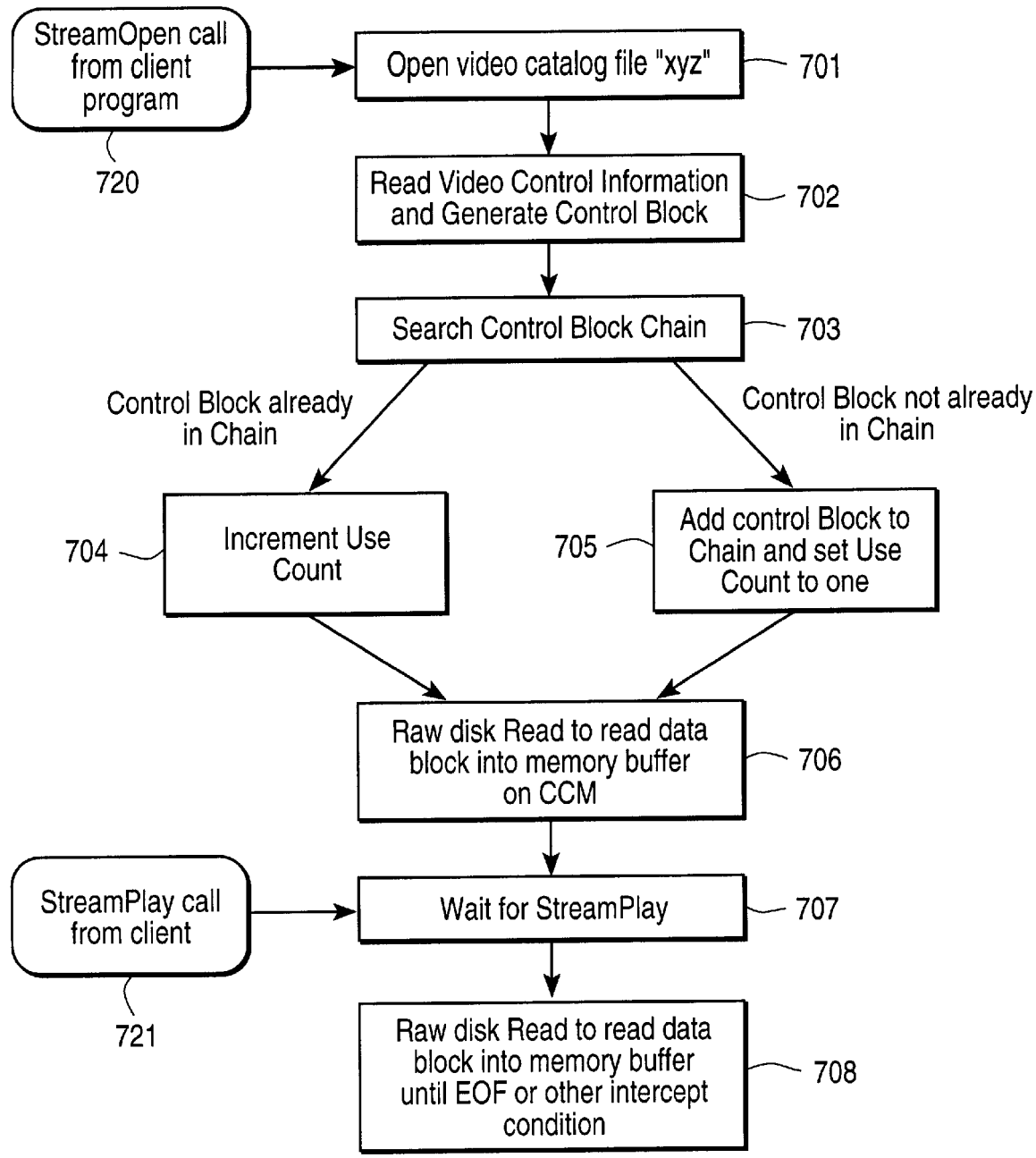
FIG. 7 is a flow diagram of the process of opening a video object for playback.

Video object playback is initiated by a client program 206 making calls to the StreamOpen() and then StreamPlay() functions. A client program 206, for example may call the StreamOpen() and StreamPlayback() functions to initiate playback of a video object named "XYZ." FIG. 7 is a flow diagram of the processes of opening a video object for playback.

When the StreamOpen() function is called 720, the program code 231 opens 701 the video catalog file 237 (for example, "/svsdrive/cat/xyz") and reads its contents. The information read from the video catalog file 237 (such as stream data rate, video object size) is used to control the playback of the video object.

Then for each stripe of the video object, the program code 231 reads 702 the space map file (stored on the storage device 131 assigned to the particular video stripe) to generate a control block.

Next, program code 231 searches 703 the control block chain associated with the storage device 131 to which the video stripe is assigned. If a control block for the video stripe already exists in the chain, the program code 231 increments 704 a use count. If the control block is not in the chain, the program code 231 adds 705 the control block to the control block chain and sets the use count to one.

After performing the search 703, the program code 231 next uses the space map information stored in the control block to perform raw disk read operations 706 from Partition 1 of storage devices 131 to read the video object data into memory buffers 114.

The program code 231 waits 707 for the StreamPlay() function.

When the StreamPlay() function is subsequently called 721 by the client program 206, CCM 110 sends the video object data from memory buffers 114 to DM 120 for processing. The program code 231 continues performing raw disk read operations 708 until the end of the video object has been reached or an intercept condition occurs such as a user-specified end condition (such as a time limit). The program code 231 then calls the client with a callback function to notify the client program 206 the ending of the playback.

The client program 206 then calls the StreamClose() function. The program code 231 will then perform a close process for each stripe of the video object in response to the StreamClose() function call.

The dose processes includes decrementing the use count associated with the space map file in the control block chain. If after decrementing, the use count is zero, the control block is deleted from the control block chain.

After decrementing the use count, program code 231 next closes the space map file for the stripe of the video object.

Finally, the program code 231 closes the video catalog file 237 (for example, "/svsdrive/cat/xyz") for the video object.

Disk Load Balancing (Scheduling)

In a multi-stream VOD system 100, if the start time of each video playback stream is not regulated, one or more storage devices 131 may become overloaded by receiving too many messages requesting a read at the same time. When this happens, some messages may not be handled in time to meet the timing requirement for continuous stream playback. This will result in undesirable glitches in the video playback. VOD system 100 preferably uses a data striping scheme to interleave the storage of a video object onto multiple storage devices 131 and additionally uses a scheduling method to regulate the start time of each video stream so that none of the storage devices 131 will be overloaded. The scheduling method also minimizes the time delay before starting a stream.

Preferably, the scheduling method is used independently for each set of disks in a striping group.

Time zones are used to distribute the starting of the playback of the video streams to avoid bunching (overloading) disk access. Each video stream is scheduled (assigned) to initiate in a particular time zone. In accordance with the scheduling method, there are M time zones (where M is the number of storage devices 131 in the striping group). The M time zones are represented as $Z_1 \ldots Z_m$.

Table 1 below illustrates a preferred time zone rotation in a system having four storage devices 131 per striping group.

TABLE 1

| | Current Time → | | | | |
|---|---|---|---|---|---|
| | $T_1$ | $T_2$ | $T_3$ | $T_4$ | $T_{n \bmod N}$ |
| Disk 1 | $Z_1$ | $Z_2$ | $Z_3$ | $Z_4$ | $Z_{n \bmod N}$ |
| Disk 2 | $Z_4$ | $Z_1$ | $Z_2$ | $Z_3$ | $Z_{(n+3) \bmod N}$ |
| Disk 3 | $Z_3$ | $Z_4$ | $Z_1$ | $Z_2$ | $Z_{(n+2) \bmod N}$ |
| Disk 4 | $Z_2$ | $Z_3$ | $Z_4$ | $Z_1$ | $Z_{(n+1) \bmod N}$ |

Time is measured in predefined fixed length time intervals called time slots ($T_n$). During time slot $T_1$, for example, disk 1 initiates only video streams assigned to time zone $Z_1$, disk 2 initiates only video streams assigned to time zone $Z_2$ and so forth. Similarly, during time slot $T_2$ disk 1 initiates video streams assigned time zone $Z_2$, disk 2 initiates video streams assigned to time zone $Z_3$ and so forth. Rather the assigning each video object to a fixed and predetermined time zone ($Z_i$) as is done in conventional methods, the start of playback of the video object is assigned to the earliest available time zone ($Z_i$) associated with the storage device 131 from which the video stream will commence. The earliest available time zone ($Z_i$) is the next time zone ($Z_i$) having sufficient capacity to handle the playback without introducing any glitches in any video streams presently assigned to time zone $Z_i$.

In one preferred embodiment M=six. In other embodiments, different numbers of storage devices 131 are assigned to a particular striping group.

Figure 8:
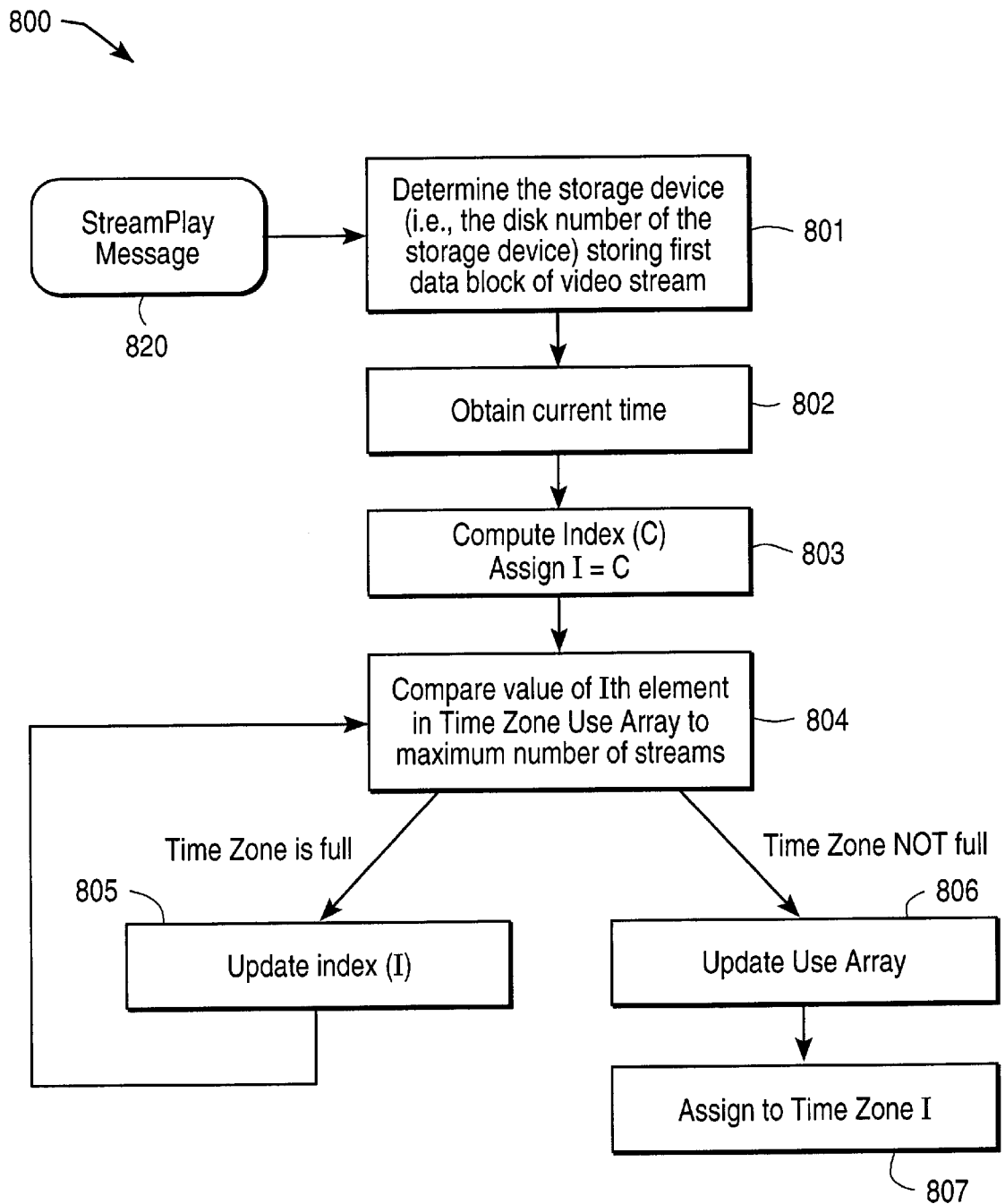
FIG. 8 is a flow diagram of a scheduling method to time balance the access load across a plurality of storage devices as shown in FIG. 1A.

FIG. 8 is a flow chart of the scheduling method 800 in accordance with a VOD system having M storage devices 131 in a striping group.

The scheduling method 800 starts when a stream thread 204 receives a Stream Play message 820 to start the playback of a video stream. Stream thread 204 then determines 801 the disk number, n, of the storage device 131 that is storing first data block to be read. Next, stream thread 204 obtains 802 the current time (t).

Then, storage thread 204 computes 803 an index value (C) representing the current time zone. The index value (C) is computed in accordance with the following equation:

$$C = (\text{floor}(t/T) - n) \bmod M$$

where t=current time
T=the time duration to playback a data block (i.e. T=data_block_size/stream_playback_data_rate)
n=the storage device number within the striping group
M=total number of storage devices within the striping group
Floor=a function that returns truncates its argument to return an integer value The scheduling method 800 uses a zone use array $Z[1 \ldots M]$ having M elements. The M elements are each initially set to zero and represent the number of active playback streams assigned to each of the corresponding M time zones.

After computing 803 the index value C, stream thread 204 then sets index I equal to C. The stream thread 204 next compares 804 the value of the Ith element of the zone use array Z to the maximum number of streams that can be allocated to a time zone. The maximum number of streams per time zone is dependent on the access times for the particular storage device 131. If the comparison 804 returns a result indicating that the time zone is full (i.e., already has the maximum number of streams) then the method updates 805 the index value I in accordance with the following equation:

$$I=(I+1) \bmod M$$

After updating 805 the index value, the method returns to comparison 804.

If, however, comparison 804 returns a result indicating that the time zone is not full, then the use array Z is updated 806 and the video stream is assigned 807 to the time zone $Z_I$.

After assigning 807 the video stream to a time zone, the video stream starts playback after a time delay in accordance with the following equation:

$$\text{time delay} = ((I+M+C) \bmod M) + T$$

This time delay is introduced to start playback in the desired (selected) time slot.

When a stream thread 204 receives a StreamPause() call or when it has completed playback of the stream, the stream thread 204 decrements the use value $Z_1$ associated with the playback stream.

RAID System and Method

The VOD system 100 uses an inventive redundant array of independent disks (RAID) system and method. In accordance with the invention, SM 130 uses a plurality of storage devices 131 to store the plurality of video objects. It should be understood that the inventive RAID system and method is not limited to video server applications and is useful in any computer system or configuration using an array of storage devices.

The RAID system and method in accordance with the present invention allows for a storage subsystem (SM 130) that comprises a large number of disks to achieve high performance throughput for data access while limiting the performance penalty during dynamic reconstruction of missing data when one or more disk fails. The system and method further allows continuous operation by achieving dynamic data reconstruction when N/(M+1) or fewer storage devices 131 (disks) fail in an array of N disks, where (1) M is a redundancy factor specified by the creator of a data object (or assigned as a default value) when the data object is stored into the disk array, and (2) the distance of any two failed disks is greater than M.

The system and method interleaves the storage of a data object onto N disks, where N can be as large as desired to gain high performance by allowing a large number of parallel disk operations, and to create a parity block for every M data blocks, where M is an integer number smaller than N and can be as small as desirable (if M is selected to be 1, it will be equivalent to RAID level 1—mirroring) to limit the performance penalty during dynamic data reconstruction so that performance level can be guaranteed in all situations. A smaller M means higher storage overhead for redundant data.

An exemplary application of this invention is a multi-stream VOD system 100, where the total disk throughput ranges from tens of megabytes per second to hundreds or thousands of megabytes per second. A single video object stored in video server 105 may be requested by tens, hundreds or even thousands of users at the same time. Therefore, it is essential to be able to stripe the video object onto a high number of disks, for example, 20 disks, so that all 20 disks can be performing parallel operations to meet the requests of hundreds of users. In this case, the Redundancy Factor, M for the video object may be selected to be, for example, four, so that when a disk fails, it only requires four parallel disk reads to reconstruct a missing data block. This not only guarantees the response time in such a scenario, but it also adds very little to the overall system workload because these four disk reads are close to the missing data and they are needed during normal video playback anyway, and therefore they are not extra disk operations (as compared to the normal access). For this description, assume that there are N disks in the array (numbered 0 through N−1). Also, preferably when the data object (such as a video object) is created, the data are delivered in striping block size and in sequence (the data blocks are numbered 0,1,2, . . .).

Figure 9:
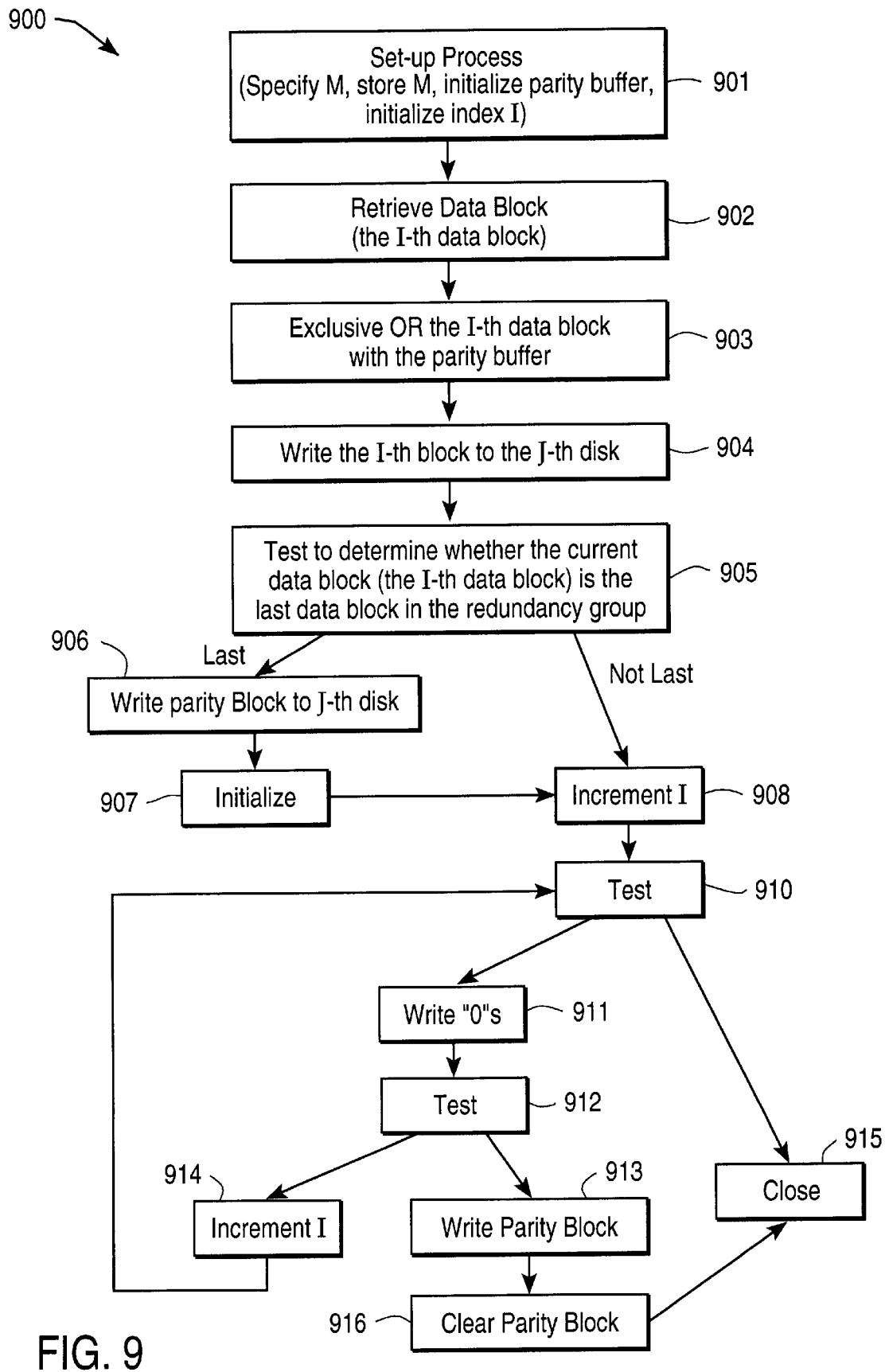
FIG. 9 is a flow diagram of a method of storing a video object on an array of disk drives using a redundancy factor (M) to generate parity codes for every M data blocks.

FIG. 9 is a flow diagram of a RAID method 900 of storing a video object in accordance with the present invention. The method first performs a set-up process 901. In the set-up process 901, the creator (for example, either a computer program or a user) of the video object specifies a redundancy factor M for the video object. M is an integer between 1 and N−1 inclusive, where N is the number of storage devices 131 in the SM 130.

Next, during set-up 901, the method stores the redundancy factor M as an attribute of the video object. The method additionally initializes an index (I) to zero and defines and initializes a parity buffer on DRAM 232.

Then, the system retrieves 902 data blocks to be written to the video object. For each data block, the method performs an exclusive OR operation 903 of the I-th data block to the parity buffer. The method 900 then writes 904 the I-th data block to the J-th disk, where:

$$J = \{\text{floor}(I/M)*(M+1) + (I \bmod M)\} \bmod N.$$

Further, the I-th data block is written as the K-th block of the stripe of the video object on the J-th disk, where:

$$K = \text{floor}(\{\text{floor}(I/M)*(M+1) + (I \bmod M)\}/N).$$

The method next tests 905 to determine whether the current data block (the I-th data block) is the last data block in the redundancy group. The test 905 is performed by determining whether:

(i) I is greater than or equal to (M−1); and
(ii) ((I+1) mod M) is equal to 0. If this condition is met, then the method 900 writes 906 the parity buffer to the J-th disk, where:

$$J = \{(I+1)/M*(M+1) - 1\} \bmod N.$$

The parity buffer is written 906 as the K-th block of the stripe of the data object on J-th disk, where:

$$K = \text{floor}(\{(I+1)/M*(M+1) - 1\}/N).$$

After writing 906 the parity buffer to the J-th disk, the parity buffer is cleared (re-initialized) 907.

The method 900 next increments 908 the index (I) by one. The method 900 then tests 909 to determine whether the last data block of the video object has been written to disk. If the last data block has not been written (i.e. there are more data blocks to be written) the method 900 returns to retrieve 902 the next data block to be written to the video object and continue the method 900. Otherwise, the method 900 proceeds to test 910 to determine whether the current data block (the I-th data block) is the last data block in the redundancy group. The test 910 is performed by calculating (I mod M). If (I mod M) is not equal to zero, then the redundancy group has less than M data blocks and thus, the method proceeds to write 911 a data block filled with all zeros to the J-th disk, where:

J={floor(I/M)*(M+1)+(I mod M)}mod N.

The I-th data block is written 911 as the K-th block of the stripe of the data object on J-th disk, where:

K=floor({floor(I/M)*(M+1)+(I mod M)}/N).

The method 900 next tests 912 to determine whether the I-th data block is the last data block in the redundancy group. This condition is met if:

(i) I is greater than or equal to (M−1); and (ii) ((I+1) mod M) is equal to 0.

If the condition is met, then the method writes 913 the parity buffer to the J-th disk, where:

J={(I+1)/M*(M+1)−1}mod N.

Further, the parity buffer is written 913 as the K-th block of the stripe of the data object on J-th disk, where:

K=floor({(I+1)/M*(M+1)−1}/N).

The method 900 then clears 916 the parity buffer and then closes 915 all N stripes for the data object. If, on the other hand, during test 912 the condition is not met, the method 900 then increments 914 and then returns to perform test 910 to determine whether the current data block (the I-th data block) is the last data block in the redundancy group.

Figure 10:
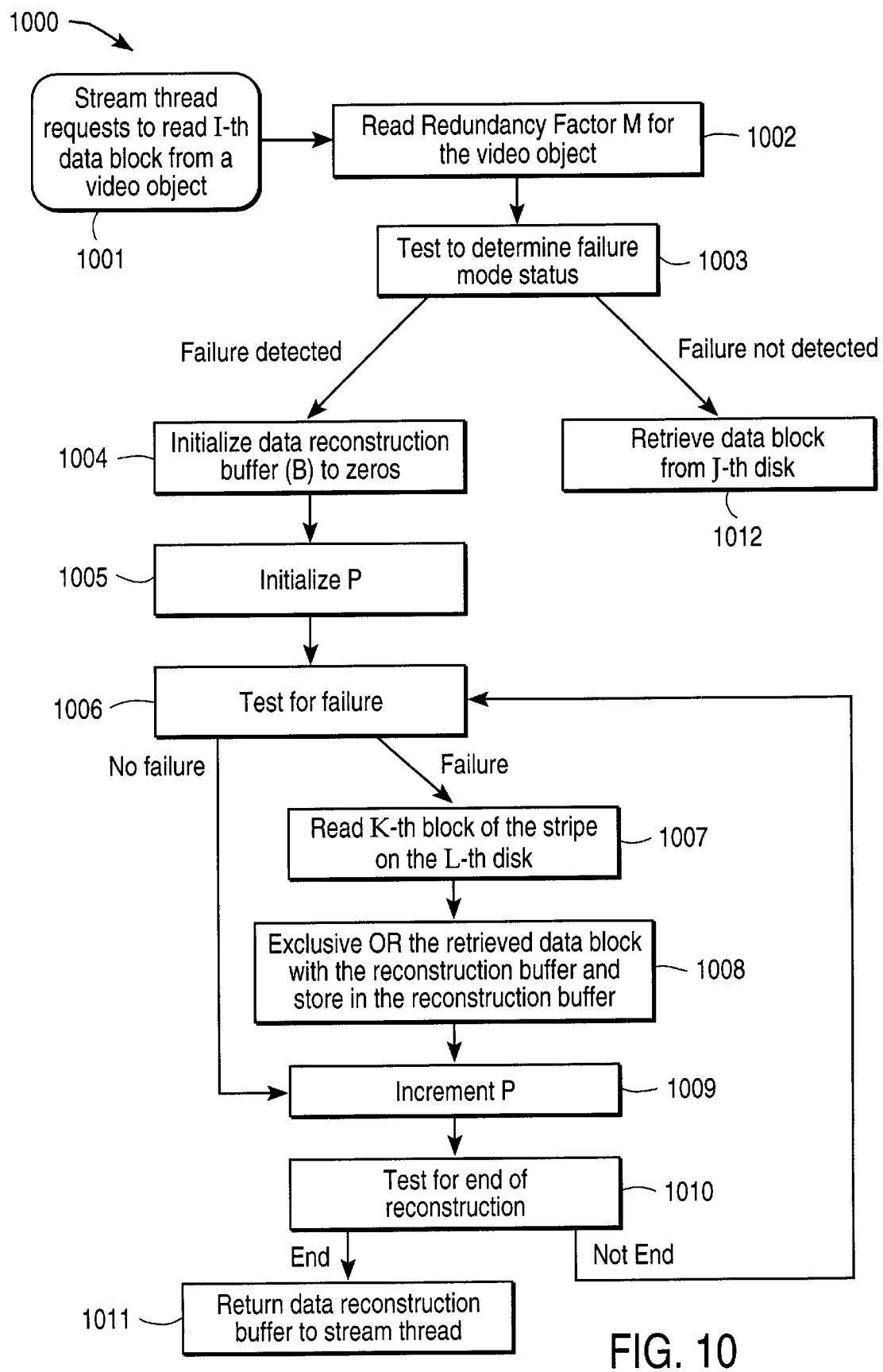
FIG. 10 is a flow diagram of the process of retrieving data blocks stored in accordance with the method shown in FIG. 9.

FIG. 10 is a flow diagram of a RAID method 1000 of accessing a video object in accordance with the present invention. The method starts when a stream thread 204 requests 1001 to read the I-th data block from a video object stored on the J-th disk. Upon receipt of a read request, the method 1000 reads 1002 the redundancy factor M associated with the video object. Next, the method 1000 tests 1003 to determine the failure mode status. If the test 1003 indicates that a failure has not occurred, then the method retrieves the data block from the appropriate disk (the J-th disk). If, however, the test 1003 determines that a failure has occurred, then the method initializes 1004 a data reconstruction buffer to all zeros. Next, the method 1000 initializes 1005 the index P to zero. By initializing P to zero, P is initialized to index to the first data block in the redundancy group.

The method 1000 then tests 1006 P to determine if the P-th data block is not stored on a disk that has failed. If the method determines that the P-th data block is stored on a failed disk, then the method 1000 proceeds to read 1007 the K-th data block of the stripe on the L-th storage device where:

L={J+N−(I mod M)+P}mod N

J={floor(I/M)*(M+1)+(I mod M)}mod N; and

K=floor({floor(I/M)*(M+1)+(P mod M)}/N).

The method then performs an exclusive OR operation 1008 on the retrieved data and the data stored in the reconstruction buffer. The method then proceeds to increment 1009 the index P. After incrementing 1009, the method 1000 then tests 1010 to determine whether reconstruction is complete (i.e. whether P>M). If reconstruction is complete the method 1000 returns 1011 the data in the reconstruction buffer to the stream thread 204. Otherwise, if reconstruction is not complete, the method returns to test 1006.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A method of storing digital data in a plurality of storage devices (N), comprising:

dividing the digital data into N data blocks;

storing the N data blocks on the plurality of storage devices;

selecting a redundancy factor (M) wherein M is an integer less than N;

generating an error recovery block for every M data blocks; and storing the error recovery block on a different storage device from the storage devices storing the associated data blocks.

2. The method of claim 1 wherein generating an error recovery block comprises computing a parity code.

3. The method of claim 2 wherein storing a plurality of data blocks on each storage device comprises striping each data block (I) across a subset of the plurality of storage devices.

4. The method of claim 3, wherein striping the I-th data block across a subset of the plurality of storage devices comprises:

computing J={floor(I/M)*(M+1)+(I mod M)}mod N;

computing K=floor({floor(I/M)*(M+1)+(I mod M)}/N);

writing the I-th data block as the K-th stripe on the J-th storage device.

5. The method of claim 2, wherein the parity code for an I-th data block is written in a parity buffer when I is the last block in the error recovery group, by performing the steps of:

(a) initializing a parity buffer;

(b) testing whether I is the last block in the error recovery group;

(c) computing J={(I+1)/M*(M+1)−1}mod N;

(d) computing K=floor({(I+1)/M*(M+1)−1}/N);

(e) writing the parity buffer for the I-th data block as the K-th stripe on the J-th disk;

(f) reinitializing the parity buffer and testing whether the I-th data block is the last data block in the error recovery group;

(g) responsive to the I-th data block not being the last data block in the error recovery group, writing a data block with all zeros to the J-th disk and writing the I-th data block as the K-th stripe on the J-th disk;

(h) responsive to the I-th data block being the last data block in the error recovery group, writing the parity buffer to the J-th disk.

6. The method of claim 1, wherein the digital data comprises video data.

7. The method of claim 1, further comprising accessing the stored digital data.

8. A method for accessing digital data stored in a plurality of storage devices (N), the digital data being divided into N data blocks, the method comprising:
   reading a redundancy factor (M) associated with the stored digital data, wherein M is an integer less than N;
   determining whether any of the plurality of storage devices has failed;
   responsive to none of the plurality of storage devices having failed, retrieving the data blocks from the storage devices storing the data blocks; and
   responsive to at least one of the plurality of storage devices having failed:
      determining, for each data block (I), whether it is stored on a storage device that has failed;
      for each data block (I) stored on a storage device that has failed, reconstructing the I-th data block from M storage devices; and
      for each data block (I) not stored on a storage device that has failed, retrieving the I-th data block.

9. The method of claim 8, wherein the stored digital data comprises video data.

10. The method of claim 8, further comprising:
    receiving a request to read the digital data.

11. The method of claim 8, wherein reconstructing the I-th data block from M storage devices comprises:
    initializing a data reconstruction buffer to zero;
    initializing an index (P) to zero;
    performing operations comprising:
       computing $K = \text{floor}(\{\text{floor}(I/M)*(M+1)+(P \bmod M)\}/N);$ $J = \{\text{floor}(I/M)*(M+1)+(I \bmod M)\} \bmod N;$ and $L = \{J+N-(I \bmod M)+P\} \bmod N;$ retrieving data from the K-th block of the stripe on the L-th disk;
       performing an exclusive OR operation of the retrieved data with the reconstruction buffer;
       storing the result of the exclusive OR operation in the reconstruction buffer;
       incrementing P;
       determining whether P is greater than M;
    responsive to P not being greater than M, determining if the P-th data block is stored on a storage device having failed, and responsive to the P-th data block being stored on a failed storage device, then repeating the performing operations until P is greater than M.

12. An electronically readable medium storing a program for permitting a computer to perform a method for storing digital data in a plurality of storage devices (N), the method comprising:
    dividing the digital data into N data blocks;
    storing the N data blocks on the plurality of storage devices;
    selecting a redundancy factor (M) wherein M is an integer less than N;
    generating an error recovery block for every M data blocks; and
    storing the error recovery block on a different storage device from the storage devices storing the associated data blocks.

13. An electronically readable medium storing a program for permitting a computer to perform a method for accessing digital data stored in a plurality of storage devices (N), the digital data being divided into N data blocks, the method comprising:
    reading a redundancy factor (M) associated with the stored digital data, wherein M is an integer less than N;
    determining whether any of the plurality of storage devices has failed;
    responsive to none of the plurality of storage devices having failed, retrieving the data blocks from the storage devices storing the data blocks; and
    responsive to at least one of the plurality of storage devices having failed:
       determining, for each data block (I), whether it is stored on a storage device that has failed;
       for each data block (I) stored on a storage device that has failed, reconstructing the I-th data block from M storage devices; and
       for each data block (I) not stored on a storage device that has failed, retrieving the I-th data block.

14. A disk load balancing method for scheduling the start of playback of a particular video stream, the method comprising:
    defining a plurality of time zones, the number of times zones corresponding to a number of storage devices (M) for storing video streams; and
    assigning each video stream to initiate playback at an associated time zone by identifying the storage device (n) from which a particular video stream will commence and by determining a next available time zone associated with the storage device from which the particular video stream will commence playback.

15. The method of claim 14 wherein defining the plurality of time zones comprises computing an index value $C = (\text{floor}(t/T) - n) \bmod M$, wherein
    t is current time; and
    T is time duration to playback a data block.

16. An electronically readable medium storing a program for permitting a computer to perform a method for scheduling the start of playback of a particular video stream, the method comprising:
    defining a plurality of time zones, the number of times zones corresponding to a number of storage devices for storing video streams; and
    assigning each video stream to initiate playback at an associated time zone by identifying the storage device from which a particular video stream will commence and by determining a next available time zone associated with the storage device from which the particular video stream will commence playback.

17. A method of storing digital data in a plurality of storage devices (N), comprising:
    dividing the digital data into N data blocks;
    storing the N data blocks on the plurality of storage devices;
    selecting a redundancy factor (M) wherein M is an integer less than N;
    generating an error recovery block for every M data blocks; and
    storing the error recovery block on a different storage device from the storage devices storing the associated data blocks;
    wherein generating an error recovery block comprises computing a parity code;
    wherein storing a plurality of data blocks on each storage device comprises striping each data block (I) across a subset of the plurality of storage devices;

wherein striping the I-th data block across a subset of the plurality of storage devices comprises:
computing J={floor(I/M)*(M+1)+(I mod M)}mod N;
computing K=floor({floor(I/M)*(M+1)+(I mod M)}/N);
writing the I-th data block as the K-th stripe on the J-th storage device.

18. An electronically readable medium storing a program for permitting a computer to perform a method of storing digital data in a plurality of storage devices (N), the method comprising:
dividing the digital data into N data blocks;
storing the N data blocks on the plurality of storage devices;
selecting a redundancy factor (M) wherein M is an integer less than N;
generating an error recovery block for every M data blocks; and
storing the error recovery block on a different storage device from the storage devices storing the associated data blocks;
wherein generating an error recovery block comprises computing a parity code;
wherein storing a plurality of data blocks on each storage device comprises striping each data block (I) across a subset of the plurality of storage devices;
wherein striping the I-th data block across a subset of the plurality of storage devices comprises:
computing J={floor(I/M)*(M+1)+(I mod M)}mod N;
computing K=floor({floor(I/M)*(M+1)+(I mod M)}/N);
writing the I-th data block as the K-th stripe on the J-th storage device.

19. A method of storing digital data in a plurality of storage devices (N), comprising:
dividing the digital data into N data blocks;
storing the N data blocks on the plurality of storage devices;
selecting a redundancy factor (M) wherein M is an integer less than N;
generating an error recovery block for every M data blocks; and
storing the error recovery block on a different storage device from the storage devices storing the associated data blocks;
wherein generating an error recovery block comprises computing a parity code;
wherein the parity code for an I-th data block is written in a parity buffer when I is the last block in the error recovery group, by performing the steps of:
(a) initializing a parity buffer;
(b) testing whether I is the last block in the error recovery group;
(c) computing J={(I+1)/M*(M+1)−1}mod N;
(d) computing K=floor({(I+1)/M*(M+1)−1}/N);
(e) writing the parity buffer for the I-th data block as the K-th stripe on the J-th disk;
(f) reinitializing the parity buffer and testing whether the I-th data block is the last data block in the error recovery group;
(g) responsive to the I-th data block not being the last data block in the error recovery group, writing a data block with all zeros to the J-th disk and writing the I-th data block as the K-th stripe on the J-th disk;
(h) responsive to the I-th data block being the last data block in the error recovery group, writing the parity buffer to the J-th disk.

20. An electronically readable medium storing a program for permitting a computer to perform a method of storing digital data in a plurality of storage devices (N), the method comprising:
dividing the digital data into N data blocks;
storing the N data blocks on the plurality of storage devices;
selecting a redundancy factor (M) wherein M is an integer less than N;
generating an error recovery block for every M data blocks; and
storing the error recovery block on a different storage device from the storage devices storing the associated data blocks;
wherein generating an error recovery block comprises computing a parity code;
wherein the parity code for an I-th data block is written in a parity buffer when I is the last block in the error recovery group, by performing the steps of:
(a) initializing a parity buffer;
(b) testing whether I is the last block in the error recovery group;
(c) computing J={(I+1)/M*(M+1)−1}mod N;
(d) computing K=floor({(I+1)/M*(M+1)−1}/N);
(e) writing the parity buffer for the I-th data block as the K-th stripe on the J-th disk;
(f) reinitializing the parity buffer and testing whether the I-th data block is the last data block in the error recovery group;
(g) responsive to the I-th data block not being the last data block in the error recovery group, writing a data block with all zeros to the J-th disk and writing the I-th data block as the K-th stripe on the J-th disk;
(h) responsive to the I-th data block being the last data block in the error recovery group, writing the parity buffer to the J-th disk.

21. A method for accessing digital data stored in a plurality of storage devices (N), the digital data being divided into N data blocks, the method comprising:
reading a redundancy factor (M) associated with the stored digital data, wherein M is an integer less than N;
determining whether any of the plurality of storage devices has failed;
responsive to none of the plurality of storage devices having failed, retrieving the data blocks from the storage devices storing the data blocks; and
responsive to at least one of the plurality of storage devices having failed:
determining, for each data block (I), whether it is stored on a storage device that has failed;
for each data block (I) stored on a storage device that has failed, reconstructing the I-th data block from M storage devices; and
for each data block (I) not stored on a storage device that has failed, retrieving the I-th data block;
wherein reconstructing the I-th data block from M storage devices comprises:
initializing a data reconstruction buffer to zero;
initializing an index (P) to zero;
performing operations comprising:
computing K=floor({floor(I/M)*(M+1)+(P mod M)}/N);

$J=\{floor(I/M)*(M+1)+(I \bmod M)\} \bmod N$; and $L=\{J+N-(I \bmod M)+P\} \bmod N$;

retrieving data from the K-th block of the stripe on the L-th disk;
    performing an exclusive OR operation of the retrieved data with the reconstruction buffer;
    storing the result of the exclusive OR operation in the reconstruction buffer;
    incrementing P;
    determining whether P is greater than M;
  responsive to P not being greater than M, determining if the P-th data block is stored on a storage device having failed, and responsive to the P-th data block being stored on a failed storage device, then repeating the performing operations until P is greater than M.

22. An electronically readable medium storing a program for permitting a computer to perform a method for accessing digital data stored in a plurality of storage devices (N), the digital data being divided into N data blocks, the method comprising:

reading a redundancy factor (M) associated with the stored digital data, wherein M is an integer less than N;
  determining whether any of the plurality of storage devices has failed;
  responsive to none of the plurality of storage devices having failed, retrieving the data blocks from the storage devices storing the data blocks; and
  responsive to at least one of the plurality of storage devices having failed:
    determining, for each data block (I), whether it is stored on a storage device that has failed;
    for each data block (I) stored on a storage device that has failed, reconstructing the I-th data block from M storage devices; and
    for each data block (I) not stored on a storage device that has failed, retrieving the I-th data block;
    wherein reconstructing the I-th data block from M storage devices comprises:
      initializing a data reconstruction buffer to zero;
      initializing an index (P) to zero;
      performing operations comprising:
        computing $K=floor(\{floor(I/M)*(M+1)+(P \bmod M)\}/N)$;

$J=\{floor(I/M)*(M+1)+(I \bmod M)\} \bmod N$; and $L=\{J+N-(I \bmod M)+P\} \bmod N$;

retrieving data from the K-th block of the stripe on the L-th disk;
    performing an exclusive OR operation of the retrieved data with the reconstruction buffer;
    storing the result of the exclusive OR operation in the reconstruction buffer;
    incrementing P;
    determining whether P is greater than M;
  responsive to P not being greater than M, determining if the P-th data block is stored on a storage device having failed, and responsive to the P-th data block being stored on a failed storage device, then repeating the performing operations until P is greater than M.

23. A method of storing a video object in N storage devices, the method comprising:

(a) performing a set-up process including specifying a redundancy factor M for the video object, wherein M is less than N and wherein the video object includes data blocks;

(b) storing the redundancy factor M as an attribute of the video object, and initializing an index (I) and a parity buffer;

(c) retrieving the current data block (I), performing an exclusive OR operation of the current data block (I) with the parity buffer, and writing the current data block (I) to a J-th disk;

(d) determining if the current data block (I) is the last data block in a redundancy group;

(e) if the current data block (I) is not the last data block in the redundancy group, then incrementing (I), (f) if the current data block (I) is the last data block in the redundancy group, then writing the parity buffer to the J-th disk, re-initializing the parity buffer and incrementing (I);

(g) determining if the last data block of the video object has been written to disk;

(h) if the last data block of the video object has been written to disk, then determining if the current data block (I) is the last data block in the redundancy group;

(i) if the last data block of the video object has not been written to disk, then repeating (c) to (h);

(j) if the current data block (I) is the last data block in the redundancy group, then writing the parity buffer to the J-th disk; and (k) if the current data block (I) is not the last data block in the redundancy group, then incrementing I and repeating (i) to (k).

24. An electronically readable medium storing a program for permitting a computer to perform a method of storing a video object in N storage devices, the method comprising:

(a) performing a set-up process including specifying a redundancy factor M for the video object, wherein M is less than N and wherein the video object includes data blocks;

(b) storing the redundancy factor M as an attribute of the video object, and initializing an index (I) and a parity buffer;

(c) retrieving the current data block (I), performing an exclusive OR operation of the current data block (I) with the parity buffer, and writing the current data block (I) to a J-th disk;

(d) determining if the current data block (I) is the last data block in a redundancy group;

(e) if the current data block (I) is not the last data block in the redundancy group, then incrementing (I), (f) if the current data block (I) is the last data block in the redundancy group, then writing the parity buffer to the J-th disk, re-initializing the parity buffer and incrementing (I);

(g) determining if the last data block of the video object has been written to disk;

(h) if the last data block of the video object has been written to disk, then determining if the current data block (I) is the last data block in the redundancy group;

(i) if the last data block of the video object has not been written to disk, then repeating (c) to (h);

(j) if the current data block (I) is the last data block in the redundancy group, then writing the parity buffer to the J-th disk; and (k) if the current data block (I) is not the last data block in the redundancy group, then incrementing I and repeating (i) to (k).

25. A method for accessing digital data stored in a plurality of storage devices (N), the digital data being divided into N data blocks, the method comprising:
(a) using a stream thread to request to read a data block (I) from a video object stored in a J-th disk;
(b) reading a redundancy factor M associated with the video object;
(c) determining if a failure occurred in any of the plurality of storage devices;
(d) if a failure has occurred, then initializing a reconstruction buffer and an index P;
(e) determining if a current data block (P) is stored in a failed disk, and if the current data block (P) is stored in a failed disk, then reading a data block (K) on a storage device (L);
(f) performing an exclusive OR operation on the data block (K) and data stored in the reconstruction buffer;
(g) incrementing P;
(h) if reconstruction is complete (P>M), then returning the data in the reconstruction buffer to the stream thread; and
(i) if reconstruction is not complete, then repeating (e) to (i).

26. An electronically readable medium storing a program for permitting a computer to perform a method for accessing digital data stored in a plurality of storage devices (N), the digital data being divided into N data blocks, the method comprising:
(a) using a stream thread to request to read a data block (I) from a video object stored in a J-th disk;
(b) reading a redundancy factor M associated with the video object;
(c) determining if a failure occurred in any of the plurality of storage devices;
(d) if a failure has occurred, then initializing a reconstruction buffer and an index P;
(e) determining if a current data block (P) is stored in a failed disk, and if the current data block (P) is stored in a failed disk, then reading a data block (K) on a storage device (L);
(f) performing an exclusive OR operation on the data block (K) and data stored in the reconstruction buffer;
(g) incrementing P;
(h) if reconstruction is complete (P>M), then returning the data in the reconstruction buffer to the stream thread; and
(i) if reconstruction is not complete, then repeating (e) to (i).

* * * * *